US006907514B2

(12) United States Patent
Mitsuishi

(10) Patent No.: US 6,907,514 B2
(45) Date of Patent: Jun. 14, 2005

(54) MICROCOMPUTER AND MICROCOMPUTER SYSTEM

(75) Inventor: Naoki Mitsuishi, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/887,843

(22) Filed: Jul. 12, 2004

(65) Prior Publication Data

US 2004/0268136 A1 Dec. 30, 2004

Related U.S. Application Data

(63) Continuation of application No. 09/503,358, filed on Feb. 14, 2000, now Pat. No. 6,763,448.

(30) Foreign Application Priority Data

| Feb. 16, 1999 | (JP) | ................................................ 11-36949 |
| Aug. 26, 1999 | (JP) | .............................................. 11-239514 |
| Jan. 25, 2000 | (JP) | ............................................... 2000-18031 |

(51) Int. Cl.[7] ............................................. G06F 13/14
(52) U.S. Cl. ......................................................... 712/38
(58) Field of Search ................... 712/38, 39; 710/100, 710/22, 27, 305, 308

(56) References Cited

U.S. PATENT DOCUMENTS

| 5,099,417 | A |   | 3/1992 | Magar et al. ................. 710/27 |
| 5,504,916 | A |   | 4/1996 | Murakami et al. ............ 710/27 |
| 5,809,259 | A |   | 9/1998 | Mitsuishi .................... 710/128 |
| 5,822,553 | A | * | 10/1998 | Gifford et al. .............. 710/305 |
| 5,848,253 | A |   | 12/1998 | Walsh et al. ................. 710/308 |
| 5,958,025 | A |   | 9/1999 | Sonobe ......................... 710/27 |
| 5,968,145 | A |   | 10/1999 | Maeda et al. ................. 710/28 |
| 6,052,744 | A |   | 4/2000 | Moriarty et al. .............. 710/27 |
| 6,223,265 | B1 | * | 4/2001 | Kawasaki et al. ........... 711/167 |
| 6,260,081 | B1 |   | 7/2001 | Magro et al. ................. 710/22 |

FOREIGN PATENT DOCUMENTS

| JP | 1-187682 | 7/1989 |
| JP | 4-24854 | 1/1992 |
| JP | 5-307516 | 11/1993 |
| JP | 7-129537 | 5/1995 |

OTHER PUBLICATIONS

LSI Handbook, published by Ohm Corporation, Nove. 30, 1984, pp. 540–541 (translation).

* cited by examiner

*Primary Examiner*—Eric Coleman
(74) *Attorney, Agent, or Firm*—Mattingly, Stanger, Malur & Brundidge, P.C.

(57) ABSTRACT

A microcomputer is provided with a data-transfer unit such as a DMA (direct memory access) controller for controlling a transfer of data through an external bus. Used in an access to an external device controlled by the data-transfer unit, a bus-interface means of the microcomputer includes a buffer-register means which can be specified as either a source location or a destination location of a data transfer. Thus, an internal-bus master such as a CPU employed in the microcomputer is capable of reading out information such as a packet command from the buffer-register means at a high speed through an internal bus without using the external bus and, hence, capable of carrying out an operation reflecting a transfer control condition specified by the packet command.

4 Claims, 20 Drawing Sheets

MICROCOMPUTER AND MICROCOMPUTER SYSTEM

The above-referenced patent application is a continuation application of U.S. Ser. No. 09/503,358 filed Feb. 14, 2000 now U.S. Pat. No. 6,763,448, from which priority is claimed under 35 U.S.C. § 120.

BACKGROUND OF THE INVENTION

In general, the present invention relates to a microcomputer and a semiconductor integrated circuit including an embedded data-transfer device. More particularly, the present invention relates to an effective technology applicable to typically a single-chip data processor or a single-chip microcomputer.

A typical microcomputer comprises functional blocks such as a CPU (central processing circuit) serving as a nucleus component, a ROM (read-only memory) for storing a program, a RAM (random-access memory) for storing data and an input/output circuit for inputting and outputting data which are built on a semiconductor substrate as described on pages 540 to 541 of a publication entitled "LSI Handbook" published by Ohm Corporation on Nov. 30, 1984.

The microcomputer may include an embedded DMAC (direct memory access controller) which is capable of transferring data independently of the CPU. An example of a document describing such a microcomputer is Japanese Patent Laid-open No. Hei 5-307516.

In addition, a microcomputer may have an external-bus-right releasing function for releasing a right to make an access to an external bus to an external device. After the right to make an access to the external bus has been granted to an external device, however, the CPU is still capable of carrying out an operation using an internal bus such as an operation to read out information from the ROM. If a DMAC is connected to the external bus of the microcomputer as an external device, it is possible to transfer data through the external bus using the external DMAC in parallel to an operation based on the internal bus such as an operation to read out information from the ROM. Japanese Patent Laid-open No. Hei 4-24854 is an example of a document describing a microcomputer wherein a CPU's operation based on an internal bus and a DMAC's operation based on an external bus can be carried out concurrently. Japanese Patent Laid-open No. Hei 1-187682 is an example of a document describing the use of 2 DMACs operating concurrently.

The inventor of the present invention studied a microcomputer including an embedded DMAC, a system employing such a microcomputer and a system comprising a microcomputer with a function to grant a right to make an access to an external bus and an external DMAC connected to the external bus.

In the first place, in the case of a microcomputer including an embedded DMAC, the DMAC can be activated by an interrupt request and is capable of operating in modes such as a repeat mode and a block-transfer mode. In a system such as a printer, a microcomputer including an embedded DMAC is suitable for a plurality of processes to control a stepping motor, control of data to be printed on the printer and operations to store incoming data into a memory, allowing a plurality of data-transfer channels to be provided.

Even though the data-transfer control of the DMAC is executed independently of the operation of the CPU, however, data is transferred by the DMAC through a bus shared by the CPU so that bus cycles required for transferring the data inevitably halt the operation of the CPU. Assume for example that data is transferred by an embedded DMAC from a RAM to an input/output circuit. In this case, a data transfer requires 6 states, i. e., 2 states for an access to the RAM, 3 states for an access to the input/output circuit and 1 state for a dead cycle. During these 6 states, the CPU is not capable of using the bus. 1 state is typically but not limited to 1 period of a reference clock signal of a data processing LSI such as a microcomputer.

In a system comprising a microcomputer with a function to grant a right to make an access to an external bus and an external DMAC connected to the external bus, on the other hand, an operation using an internal bus such as an operation carried out by a CPU to read out data from a ROM can be carried out concurrently with an operation carried out by the external DMAC to transfer data through the external bus.

In an operation to grant a right to make an access to the external bus from the microcomputer to an external component such as DMAC, however, the microcomputer must exchange signals such as a request signal and an acknowledge signal with the external component. To be more specific, the microcomputer must recognize a request signal generated by the external component and issue an acknowledge signal to the external component to recognize the request signal, spending an extra time for the exchange of the signals. In addition, in order to avoid a bus-usage collision between the microcomputer and the external DMAC, it is necessary to set a time during which both the microcomputer and the external DMAC are not using the shared bus. Such a time most likely becomes an overhead which has nothing to do with the actual operation to transfer data through the shared bus. When an overhead is required before and after each transfer of data, the overheads have a magnitude which is hardly negligible in comparison with the data transfer period itself. Moreover, if a general-purpose external DMAC is employed, some functions of the DMAC are not utilized. Thus, such a DMAC can not be said to be a cost-effective solution. If a DMAC suitable for a system is developed individually for each system only because a general-purpose DMAC is not cost effective as described above, however, the development of such a DMAC specialized for a system will incur as much a cost as the development of a new LSI separate from the microcomputer, most likely raising a manufacturing-cost problem.

SUMMARY OF THE INVENTION

Take a system such as a printer as an example. During a printing operation, it is necessary to drive a stepping motor for driving the printing mechanism and to carry out data processing peculiar to the system such as creation of data to be printed. It is also necessary to receive data from a host apparatus a synchronously with the operating state of the printer. Other systems employing a microcomputer and a DMAC include digital equipment such as a digital video deck, a DVD (digital video disc) drive and a digital TV. In such systems, it is necessary to perform signal processing such as a process to decode a digital signal and a process to encode audio and/or analog signals. In the digital equipment, it is also necessary to input and output a digital signal. In addition, it is also conceivably necessary to drive a motor for driving a medium such as a tape or a disc used for recording a digital signal. In order to increase the speed, the performance and the precision of these pieces of equipment such as the printer, the digital video deck, the DVD drive and the digital TV, it is necessary to enhance the processing power of the microcomputer employed thereby.

The needs described above led the inventor of the present invention to come up with an idea of incorporating an embedded data-transfer device such as a DMAC in a microcomputer and to discover the importance of enhancement of the total processing performance of the whole system through the use of the microcomputer.

With regard to the importance of the total processing performance enhancement, the inventor disclosed an invention of a microcomputer in Japanese Patent Laid-open No. Hei 11-36949. According to the disclosed invention, the microcomputer employs: an embedded data-transfer unit such as a direct memory access controller for controlling a transfer of data through an external bus of the microcomputer; and an embedded bus-control means for allowing an instruction using an internal bus to be executed by a data processing unit such as a CPU concurrently with a transfer of data through the external bus carried out by the data-transfer unit. The data-transfer unit is designed mainly for use in data-transfer control external to the microcomputer. In addition, in a dual-address transfer carried out by the data-transfer unit, data read out from an address in an external source is temporarily stored in a latch circuit such as an input/output port composing a bus-interface means for interfacing with an external component. Thus, in a transfer of data from an external source location to an external destination location, the data can be transferred from the external source location directly to the external destination location without the need to take the data to the embedded data-transfer unit. It is therefore unnecessary to provide a data bus for taking data being transferred to the data-transfer unit. The elimination of such a data bus contributes to the shrinkage of the physical size of the microcomputer.

Furthermore, the inventor also studied a case where, in a transfer of data through the external data bus, transfer control information such as a packet command used for specifying details of the data transfer is transferred prior to the transfer of the actual data. In some cases, the transfer control information includes data such as the number of transferred words which is required in the transfer control.

With regard to such transfer control information, the inventor disclosed an invention of a microcomputer in Japanese Patent Laid-open No. Hei 11-239514. The disclosed microcomputer is provided with an embedded buffer for delivering transfer control information to a data processing unit of the microcomputer in addition to the data-transfer unit and the bus-control means described above.

Transfer control information needs to be immediately analyzed by a data processing unit such a CPU and it is necessary to set a data transfer following the transfer control information and conforming to transfer details indicated by a result of the analysis typically in the data-transfer unit. Thus, storing the transfer control information in an external RAM serving as a buffer memory is not a good solution. This is because the CPU reads out information from an external memory in an access with a speed which is not so high as an access to an embedded memory or an I/O register. In addition, the external bus cannot probably be made as wide as the bus width of the CPU. Moreover, if the data-transfer unit is carrying out a transfer of data through another data-transfer channel, it will be quite within the bounds of possibility that the speed to process the transfer control information is reduced due to a contention for the external bus with the transfer of data. Furthermore, from the memory-management point of view, it is not desirable to store data and transfer control information in the same memory. In addition, in an attempt to read out the transfer control information from the external memory, the CPU needs to carry out special processing for verification of the existence of the transfer control information such as an operation to reference an address register employed in the data-transfer unit.

It is thus an object of the present invention addressing the problems described above to provide a microcomputer including an embedded data-transfer unit such as a DMAC for enhancing the data processing total performance and to provide a semiconductor integrated circuit with such a microcomputer embedded therein.

It is another object of the present invention to provide a microcomputer which has a function of supplying transfer control information such as a packet command used for specifying details of a data transfer to a data processing unit for analyzing the information with a high degree of efficiency and allows an increase in circuit scale caused by the function to be reduced to a minimum, and to provide a semiconductor integrated circuit with such a microcomputer embedded therein.

It is still another object of the present invention to provide a microcomputer which allows increases in physical and logical scales each to be reduced to a minimum and is capable of executing control of a data transfer through an external bus of the microcomputer concurrently with a CPU operation such as an access made by a CPU embedded in the microcomputer to an internal bus.

It is a further object of the present invention to provide a microcomputer system which is capable of executing control of a data transfer between a microcomputer employed in the system and a component external to the microcomputer concurrently with internal processing carried out by the microcomputer at a small processing overhead and allows an increase in physical scale to be reduced to a minimum.

It is a still further object of the present invention to provide an apparatus employing a microcomputer which is capable of carrying out a transfer of data between the apparatus and other equipment concurrently with processing internal to the apparatus.

The above and other objects as well as characteristics of the present invention will probably become more apparent from a study of the following description with reference to accompanying diagrams.

Outlines of representatives of the present invention disclosed in this specification are described in brief as follows.
(1) A microcomputer has a data-transfer unit 4 such as a direct access memory controller for controlling a transfer of data through an external bus of the microcomputer. The microcomputer is also provided with a bus-control means 12 for allowing an instruction using an internal bus to be executed by a data processing unit such as a CPU concurrently with a transfer of data through the external bus carried out by the data-transfer unit. As a result, the processing performance of the microcomputer can be enhanced. In other words, data can be transferred through the external bus without deteriorating the processing performance of the CPU. To put it in detail, the bus-control means 12 employed by the microcomputer is used for implementing arbitration of requests for a bus-access right and executing bus control. The bus-control means 12 allows an operation to make an access only within the microcomputer by using first internal buses IDB and IAB connected to a data processing unit to be carried out concurrently with an operation performed by the data processing unit connected to a second internal bus (or an external-address internal bus) EXAB to make an access to an external address space through a bus-interface means.

Since an instruction using an internal bus can be executed by a data processing unit such as a CPU concurrently with a transfer of data through the external bus carried out by the data-transfer unit, the processing performance of the microcomputer can be enhanced. As a result, data can be transferred through the external bus without degrading the processing performance of the microcomputer.

The bus-control means can be configured to comprise an internal-bus controller and an external-bus controller. The external-bus controller can be designed so as to allow the address space to be divided as well as bus specifications such as the type of a memory, the bus width and the number of access states to be set. In addition, the external-bus controller can be configured so as to arbitrate a request for a right to make an access to the external bus made by the data processing unit such as the CPU which serves as a bus master embedded in the microcomputer, a request for a right to make an access to the external bus made by the data-transfer unit and a request for a right to make an access to the external bus made by a component external to the microcomputer. Thus, control of internal accesses using the first internal buses IAB and IDB made by the data processing unit concurrently with accesses to the external bus made by the data-transfer unit in the first place, and control to arbitrate accesses to the external bus made by the data-transfer unit made and accesses to the external bus using the first internal buses IAB and IDB made by the data processing unit in the second place can be implemented by separated pieces of logic with ease. As a result, the control logic or the control system can be made simple with ease while, at the same time, an increase in control logical scale can be suppressed easily.

At that time, by supplying information such as an address output by the data-transfer unit to the bus-interface means through a dedicated signal line such as the second internal bus EXAB, an operation to control state transitions of the data-transfer unit can be made simple, and a simple operation contributes to reduction of the logical scale thereof.

In addition, since the external-bus controller arbitrates a request for a right to make an access to the external bus made by the data processing unit such as the CPU embedded in the microcomputer, a request for a right to make an access to the external bus made by the data-transfer unit embedded in the microcomputer and a request for a right to make an access to the external bus made by a component external to the microcomputer, it is possible to reduce an overhead which is incurred when a right to make an access to the external bus is transferred from the data processing unit to the data-transfer unit or vice versa and to enhance the processing performance.

A storage means 5 such as a ROM for storing programs to be executed by the data processing unit such as the CPU can be made selectable by specification of an operating mode so as not to include or exclude a vector of the data processing unit such as the CPU. It is thus possible to store general processing programs in an external ROM and a program requiring execution at a high speed or the like in an embedded ROM. As a result, the degree of freedom to use the microcomputer such as flexibility against program changes can be increased.

Main factors to activate the data-transfer unit and transfer modes can be limited only to functions required in a transfer of data through the external bus. Thus, the physical size can be reduced.

In addition, in a dual-address transfer carried out by the data-transfer unit, data read out from an address in an external source is temporarily stored in a latch circuit 72L such as an input/output port composing a bus-interface means 12 for interfacing with an external component. Thus, in a transfer of data from an external source location to an external destination location, the data can be transferred from the external source location directly to the external destination location without the need to take the data to the embedded data-transfer unit. It is therefore unnecessary to provide a data bus for taking data being transferred to the data-transfer unit.

If the data-transfer unit also supports a single-address transfer, the number of bus cycles required for a transfer of data can be reduced, allowing the processing performance of the microcomputer to be enhanced further.

The data-transfer unit is allowed to have a plurality of data-transfer channels. In such a configuration, a signal requesting activation of an external data transfer can be allocated to each of the data-transfer channels. As a result, it is possible to increase the degree of freedom to execute control of a data transfer in the microcomputer and the processing performance of the microcomputer.

In addition to the data processing unit such as the CPU and the data-transfer unit, a second data-transfer unit 3 such as a general-purpose DMAC capable of supporting control of data transfers inside and outside the microcomputer can also be embedded in the microcomputer. The second data-transfer unit is connected to the internal bus which is provided originally for the conventional microcomputer. In comparison with a configuration securing the number of necessary data-transfer channels in a general-purpose DMAC for controlling transfers of data inside and outside the microcomputer, a data-transfer unit specialized for transfers of data through the external bus has a configuration customized to control of data transfers through the external bus. Thus, an increase in logical scale can be reduced to a minimum even if the second data-transfer unit has a number of required data-transfer channels as a whole.

If the bus-control means allows control to refresh a DRAM or the like to be executed, requests for a right to make an access to the external bus are arbitrated by treating a refresh timer for refreshing the DRAM like a source requesting a right to make an access to the external bus.

The second data-transfer unit connected to the first internal bus and the data-transfer unit tailored to control of data transfers through the external bus can be built in a single module so that they can be used with a limited number of data-transfer channels conceded to each other.

(2) A bus-interface means 72 utilized in an access to the external bus made by the data-transfer unit in the microcomputer is provided with a plurality of buffer-register means EXDiDRm. The data-transfer unit has memory specification means 40, 41 and 72C such as address registers for specifying a memory means such as a memory device, a buffer specification means 48 for specifying one of the buffer-register means independently of the memory specification means and a mode specification means for specifying an operating mode of a data transfer. A transfer control means executes control of a data transfer on the basis of the states of the mode specification means, the memory specification means and the buffer specification means.

The mode specification means is provided with a first information field for determining whether to specify either a source location or a destination location of a data transfer by using the buffer specification means or to specify both the source and destination locations by using the memory specification means.

In a transfer of data through the external bus, any one of the buffer-register means can be used as a location indicated by either a source or destination address. One of the buffer-register means is specified by using the buffer specification means which is typically implemented by a transfer-count register instead of using the memory specification means which is a means for specifying another memory device by using typically an address or an acknowledge signal. The buffer-register means is used for inputting and outputting data from and to the external bus during a transfer of the data carried out by the data-transfer unit. The data processing unit 2 such as the CPU is capable of reading out and writing data from and into the buffer-register means through the internal bus.

As described above, transfer control information such as a packet command may be transferred through the external bus prior to a transfer of actual data. In this case, one of the buffer-register means can be used for receiving the transfer control information. As described above, one of the buffer-register means can be specified without using an address or an acknowledge signal. Since a bus cycle is not required in selecting one of the buffer-register means, a transfer of data such as reception of transfer control information can be carried out at a high speed. The data processing unit such as the CPU is capable of reading out data from a buffer-register means through the internal bus without using the external bus, making it possible to read out transfer control information from the buffer-register means at a higher speed. Since the buffer specification means allows information to be stored in a predetermined buffer-register means, the data processing unit such as the CPU does not have to carry out processing such as recognition of an address of information like a packet command. Thus, processing such as an analysis of transfer control information can be carried out by the data processing unit at a high speed and, in accordance with a result of the analysis, the data processing unit is capable of performing processing such as re-setting a data-transfer control condition for the data-transfer unit, recognition of the number of data-transfer words and changing of the location of a data-transfer destination from a buffer register to an address in a memory with a higher degree of efficiency. As a result, the data processing unit is capable of increasing the efficiency of switching to a data-transfer operation that reflects the new transfer control information.

A transfer-count register 48 can also be used as the buffer specification means. In this case, when the first information field selects the use of the buffer specification means for specification of one of the source and destination locations described above, for example, the whole or a portion of the transfer-count register can also be used in the selection of a buffer-register means. If the first information field selects the use of the memory specification means for specification of both the source and destination locations described above, on the other hand, the transfer-count register executes its native function of counting the number of transfer-data words.

The native function of the transfer-count register to count the number of transfer-data words is implemented through an arithmetic-processing means for receiving contents of the transfer-count register and returning a result of arithmetic processing to the transfer-count register. The arithmetic-processing means is also used in arithmetic processing to increment the contents of an address register which serves as the memory specification means.

The mode specification means may further include a second information field MD1. With the first information field selecting the use of the buffer specification means for specification of one of the source and destination locations described above in a transfer of data (MD2=1), the second information field MD1 determines whether to use selection of the other location as a selection of a location in a dual-addressing mode or a single-addressing mode. The other location serves as a partner of a buffer-register means specified by the buffer specification means in a transfer of data. The mode specification means may further include a third information field MD0 for determining whether to use the buffer-register means specified by the buffer specification means as a source location or a destination location.

The mode specification means may further include a fourth information field RPE and a fifth information field RPB0 to RPB2 for allowing sequential selection of source and destination locations to be carried out repeatedly.

With the first information field selecting the use of the buffer specification means for specification of one of the source and destination locations described above, the fourth information field serves as an area for storing information requesting the transfer control means 45 to: use a portion TCRL of the transfer-count register as the buffer specification means; and transfer contents of the remaining portion TCRH of the transfer-count register to the portion TCRL when a result of arithmetic processing returned from the arithmetic-processing means to the portion TCRL reaches a predetermined value.

By specifying this operation in the fourth information field, it is possible to control consecutive transfers of data while specifying a plurality of buffer-register means repeatedly in a predetermined order and to make the control simple. That is, the number of times a transfer condition is set by the data processing means for the data-transfer unit can be reduced considerably and a small number of such times facilitates reduction of a load borne by the data processing unit.

With the first information field selecting the use of the buffer specification means for specification of one of the source and destination locations described above, the fifth information field serves as an area for storing information requesting the transfer control means 45 to drive the arithmetic-processing means to: carry out arithmetic processing with a condition of a fixed logic value of higher-order bits of information input from the address register than a predetermined bit of the information; and return a result of the arithmetic processing to the address register.

By specifying this operation in information in the fifth field, the value of an address specification means such as the address register can be updated repeatedly in a sequential manner, allowing a buffer memory such as an external RAM to be used as a ring buffer. When address information in the address specification means is incremented or decremented by the arithmetic-processing means in the repetitive address updating operations carried out in order to use an external buffer memory as a ring buffer, the logic value of high-order bits of the address information than a predetermined bit of the address information is not changed. In other words, propagation of a carry or a borrow crossing the predetermined bit is avoided. As a result, the function of a ring buffer can be implemented with a minimum physical scale. Even though start and end addresses of the ring buffer can not be specified in a completely arbitrary manner, there is conceivably no big problem which will be encountered when a memory with a large storage capacity such as an external RAM is utilized as a ring buffer. Since repetitive operations can be carried out with the scheme described above, it is possible to reduce a load such as interrupt processing requested to the data processing unit such as the CPU.

(3) In a data processing system or a microcomputer system employing the microcomputer including the data-transfer unit and the bus-control means, the bus-interface means of the microcomputer is connected to the external bus which is connected to a RAM.

A data-communication circuit connected to the external bus can also be provided. The data-communication circuit supplies a signal requesting activation of an external data transfer to the data-transfer unit of the microcomputer. If a right to make an access to the external bus is granted by the bus-control means to the data-transfer unit, the data-transfer unit requests the data-communication circuit to transfer data by outputting a signal allowing a transfer of data through the external bus or a predetermined address in conjunction with a read or write signal to the data-communication circuit.

If the first information field selects the use of the memory specification means for specification of both the source and destination locations, the data-transfer unit is capable of controlling a transfer of data between the data-communication circuit and the RAM in the microcomputer system in a single-addressing mode. At that time, a signal allowing a transfer of data through the external bus is generated to request the data-communication circuit to transfer data whereas an access to the RAM is made by using an access address signal.

If the first information field selects the use of the buffer specification means for specification of one of the source and destination locations, the data-transfer unit is capable of controlling a transfer of data between the data-communication circuit and the buffer-register means in the microcomputer system in a manner corresponding to the single-addressing mode. At that time, the data-transfer unit requests the data-communication circuit to serve as a source generating transfer control information typically in the form of a packet command by using a signal allowing a transfer of data through the external bus, and uses the buffer specification means for specifying a buffer-register means.

The data processing unit fetches the transfer control information such as a packet command transferred to the specified buffer-register means for an analysis and changes the transfer condition of the data-transfer unit in accordance with a result of the analysis.

With the first information field selecting the use of the memory specification means for specification of both the source and destination locations, the data-transfer unit with the transfer condition modified is capable of controlling a transfer of data between the data-communication circuit and the RAM in the microcomputer system in a single-addressing mode, and requests the data-communication circuit to transfer data information following the packet command by using a signal allowing a transfer of data through the external bus, supplying an access address specified by the memory specification means to the RAM.

Thus, when transfer control information such as a packet command is transferred prior to a transfer of actual data, the transfer control signal can be received by a buffer-register means in the microcomputer instead of being stored in the external RAM (or a buffer memory). As a result, the data processing unit such as the CPU is capable of immediately switching its operation to an analysis of transfer control information without the need to initiate an external-bus cycle and capable of setting a transfer of data according to data-transfer details obtained as a result of the analysis of the transfer control information in the data-transfer unit quickly and transiting to a transfer of data information. Since the external RAM is used for storing only net data, the processing of data can be made simple as well.

Typical transfer protocols based on the data transfer information are the IEEE1394 and the USB (Universal Serial Bus).

The whole microcomputer system or the system excluding the external RAM can be integrated into a single semiconductor chip.

DETAILED DESCRIPTION OF THE PREFERRED EMBODIMENTS

Figure 1:
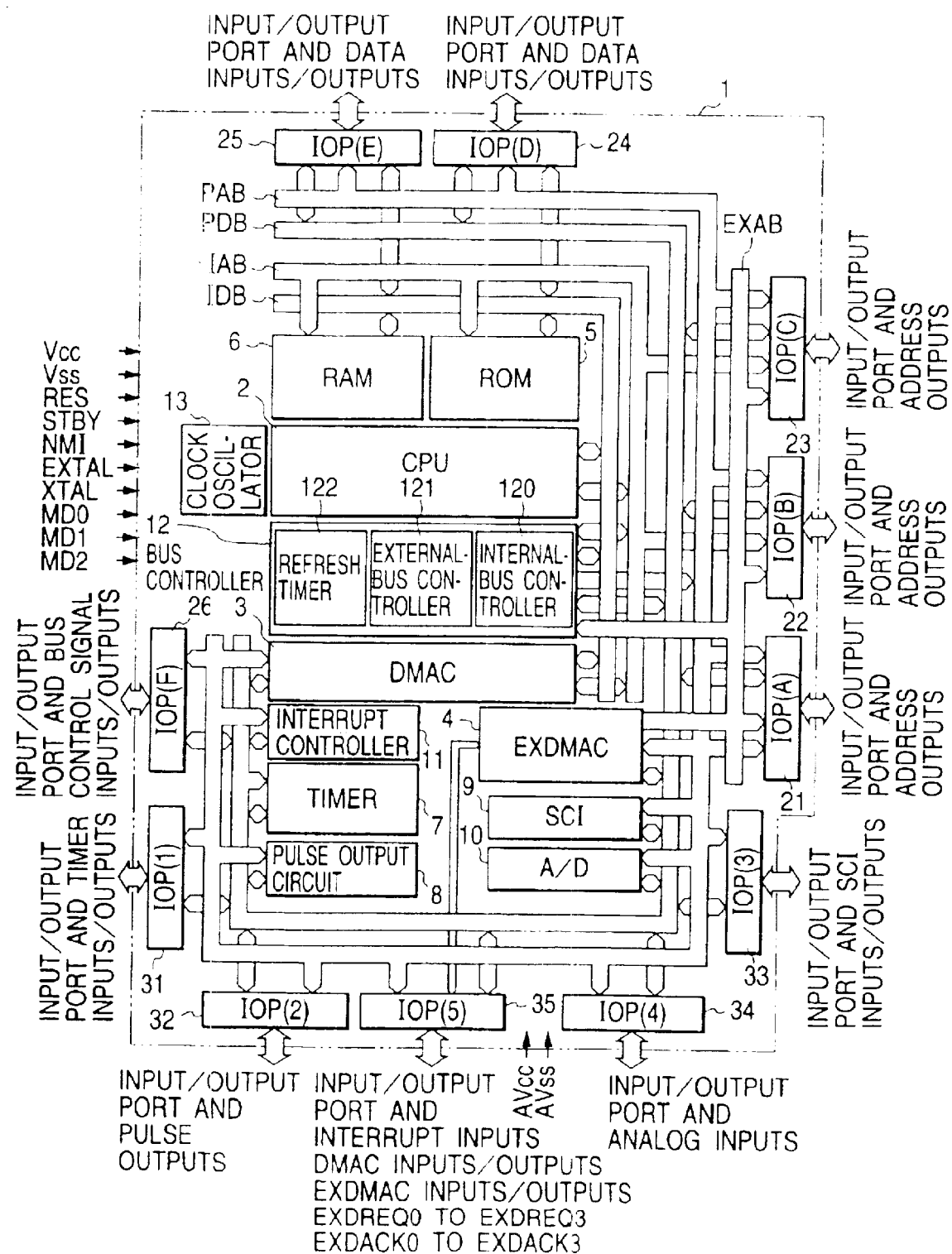
FIG. 1 is a block diagram showing a typical microcomputer provided by the present invention.

FIG. 1 is a block diagram showing a typical microcomputer provided by the present invention. The microcomputer 1 shown in the figure is a semiconductor integrated circuit created on a single semiconductor substrate (a chip) made of typically single-crystal silicon.

As shown in the figure, the microcomputer 1 comprises functional blocks or modules including a central processing unit (CPU) 2, a DMA controller (DMAC) 3 used as a second data-transfer unit capable of controlling transfers of data to and from the microcomputer, an external-bus controller DMAC (EXDMAC) 4 used as a first data-transfer unit specialized for control of data transfers through an external bus of the microcomputer, a read-only memory (ROM) 5, a random-access memory (RAM) 6, a timer 7, a pulse output circuit 8, a serial-communication interface (SCI) 9, an A/D converter (ADC) 10, an interrupt controller 11, a bus controller 12 used as a bus-control means, a clock pulse generator (CPG) 13, input/output ports (IOPA to IOPF) 21 to 26 and input/output ports (IOP1 to IOP5) 31 to 35.

The principal element of the operation of the microcomputer 1 is the CPU 2 which operates by mainly fetching instructions from the ROM 5. The CPU 2 includes an instruction control unit for fetching an instruction, decoding the fetched instruction and generating control signals for controlling other components of the CPU 2 in accordance with a result of the instruction decoding, and a processing/execution unit for processing an address and data in accordance with the control signals generated by the instruction control unit. It should be noted that the instruction control unit and the processing/execution unit are shown in none of the figures.

The DMAC 3 and the CPU 2 share internal buses IAB (internal address bus) and IDB (internal data bus). The DMAC 3 is capable of controlling a transfer of data in place of the CPU 2. To put it in detail, serving as a substitute for the CPU 2, the DMAC 3 is capable of controlling a transfer of data to and from a device internal or external to the microcomputer 1.

The EXDMAC 4 is mainly used for controlling a transfer of data through an external bus. The EXDMAC 4 is capable of controlling a transfer of data to and from an external component concurrently with an operation carried out by the CPU 2 or the DMAC 3 using the internal buses. The microcomputer 1 is designed so that the EXDMAC 4 is capable of controlling only a transfer of data to and from an external component. To be more specific, the EXDMAC 4 is capable of controlling only a transfer of data between memories provided externally to the microcomputer 1 in a dual-addressing mode or between a memory provided externally to the microcomputer 1 and an input/output circuit provided externally to the microcomputer 1 in a single-addressing mode or a dual-addressing mode. Either a single-addressing mode or a dual-addressing mode is selected in dependence on whether or not an input/output operation of the external input/output circuit is enabled by an acknowledge signal.

Details of the EXDMAC 4 will be described later. The following description explains only an outline thereof. Information such as a data-transfer control condition is set for the EXDMAC 4 by the CPU 2 through the bus controller 12 and internal P buses PDB and PAB. Arbitrated exclusively by the bus controller 12 from requests for a right to make an access to the external bus made by bus master modules such as the CPU 2 and the DMAC 3, the EXDMAC 4 acquires a right to make an access to the external bus from the bus controller 12. An address signal for controlling a transfer of data to and from an external component by the EXDMAC 4 can be output to an external component through an external-address internal bus EXAB from the IOPA 21 to the IOPC 23. At that time, in a transfer of data controlled by the EXDMAC 4 in a dual-addressing mode, the transferred data is not brought into the inside of the EXDMAC 4 but temporarily stored in latch circuits of the IOPD 24 and IOPE 4. In addition, the IOPD 24 and IOPE 25 each have a buffer register which can be used for specifying the location of either a source or a destination in a transfer of data through the external bus controlled by the EXDMAC 4.

The functional blocks of the microcomputer 1 are described in more detail as follows. The functional blocks of the microcomputer 1 are connected to each other by internal buses which include internal address and data buses in addition to a control bus not shown in the figure. The control bus transfers a bus-right request signal, a bus-access-right-request acknowledge signal, a bus command, an external-bus command, a ready signal, an external-bus ready signal, a read signal, a write signal, a bus-size signal and a system clock signal. In this embodiment, symbols IAB, PAB and EXAB denote an internal address bus, an internal P address bus and an external-address internal bus respectively whereas symbols IDB and PDB denote an internal data bus and an internal P data bus respectively. These buses are connected to the bus controller 12. The internal buses IAB and IDB are also connected to the CPU 2, the DMAC 3, the ROM 5 and the RAM 6 in addition to the bus controller 12. The internal bus IAB is further connected to the IOPA 21 to the IOPC 23 in order to allow an external address to be output. On the other hand, the internal data bus IDB is further connected to the IOPD 24 and the IOPE 25 in order to allow data to be input from and output to an external component.

In addition to the bus controller 12, the internal P buses PAB and PDB are also connected to the EXDMAC 4, the timer 7, the pulse output circuit 8, the SCI 9, the ADC 10, the interrupt controller 11, the IOPA 21 to IOPF 26 and the IOP1 31 to IOP5 35.

The external-address internal bus EXAB is connected to the EXDMAC 4 and the IOPA 21 to IOPC 23 in addition to the bus controller 12.

The bus controller 12 refers to an address signal in order to recognize the type of an access target and to select an operation conforming to bus specifications. Thus, the bus controller 12 inputs only as many high-order address bits as required for recognizing the area of the access target from an address bus. An address for controlling a transfer of data through the external bus by the EXDMAC 4 is output through the external-address internal bus EXAB.

The bus controller 12 has an internal-bus controller 120, an external-bus controller 121 and a refresh timer 122. An address is output to a component external to the microcomputer 1 by way of the IOPA 21 to the IOPC 23. On the other hand, data is input from or output to a component external to the microcomputer 1 by way of the IOPD 24 to the IOPE 25.

As an internal-bus master, the CPU 2 and the DMAC 3 are each capable of using the internal buses. Before any internal bus can be used, however, the CPU 2 or the DMAC 3 must output the respective signal requesting a right to make an access to the internal bus to the bus controller 12. An internal-bus arbiter (an internal-bus arbitration circuit) of the internal-bus controller 120 employed in the bus controller 12 arbitrates requests for a right to make an access to the internal bus made by the CPU 2 and the DMAC 3. By the same token, an external-bus arbiter (an external-bus arbitration circuit) of the external-bus controller 121 employed in the bus controller 12 arbitrates requests for a right to make an access to the external bus made by the CPU 2 and the DMAC 3, requests for a right to make an access to the external bus made by the EXDMAC 4 and a component external to the microcomputer 1 and a signal requesting a right to make an access to the bus generated by the refresh timer 122 for a refresh operation.

The EXDMAC 4, the ROM 5, the RAM 6, the timer 7, the pulse output circuit 8, the SCI 9, functional blocks of the interrupt controller 11, the IOPA 21 to the IOPF 26 and the IOP1 31 to the IOP5 35 each serve as an internal-bus slave which data is written into or read out from by an internal-bus master such as the CPU 2 or the DMAC 3. The EXDMAC 4 functions as an internal-bus slave to which an access is made when the CPU 2 sets information such as a data transfer condition in the EXDMAC 4.

The interrupt controller 11 receives interrupt signals generated by the timer 7, the SCI 9, the ADC 10 and the input/output ports, outputting an interrupt request signal to the CPU 2 and an activation request signal to the DMAC 3. In addition, the interrupt controller 11 receives a clear signal generated by the DMAC 3 and outputs an interrupt-clear signal. It should be noted that these interrupt signals are not shown in the figure.

The input/output ports 21 to 26 and 31 to 36 also input and output external-bus signals and input/output signals of input/output circuits. To be more specific, the IOPA 21 to the IOPC 23 also output addresses from the internal address buses whereas the IOPD 24 and the IOPE 25 also output and input data from and to the internal data buses. The IOPF 26 also inputs and outputs a bus control signal to and from the internal control buses. The external address bus EABUS and the external data bus EDBUS are connected to the internal address buses IAB and EXAB and the internal data bus IDB respectively through buffer circuits included in these input/output ports. The internal P buses PAB and PDB are also used for reading out and writing data from and into registers in the input/output ports and have nothing to do directly with the external buses EABUS and EDBUS. Bus control signals output by the IOPF 26 include an address strobe signal, a high/low data strobe signal, a read strobe signal, a write strobe signal and a bus-access-right-request acknowledge signal. On the other hand, bus control signals input by the IOPF 26 include a wait signal and a bus request signal or a bus-release request signal. These input and output bus control signals are not shown in the figure. Extension of an external bus is selected typically by an operating mode which also selects functions of these input/output ports.

The IOP1 31 also inputs and outputs a signal to and from the timer 7. The IOP2 32 also outputs pulses. The IOP3 33 also inputs and outputs a signal to and from the SCI 9. The IOP4 34 also inputs an analog signal. The IOP5 35 also inputs and outputs transfer-acknowledge signals EXDACK0 to EXDACK3 and transfer-request signals EXDREC0 to EXDREC3 for the EXDMAC 4 and the DMAC 3. Signals input and output by the EXDMAC 4, the DMAC 3, the timer 7, the SCI 9, the pulse output circuit 8, the ADC 10 and the IOP1 31 to the IOP5 35 and the internal-interrupt request signals are not shown in the figure.

In addition, the microcomputer 1 has input pins including power-supply pins Vcc and Vss, analog power-supply pins AVcc and AVss, a reset input pin RES, a standby input pin STBY, a non-maskable-interrupt input pin NMI, clock input pins EXTAL and XTAL and operating-mode input pins MD0, MD1 and MD2.

Figure 2:
FIG. 2 is a diagram showing address maps of the microcomputer shown in FIG. 1.

FIG. 2 is a diagram showing address maps for a predetermined operating mode of the microcomputer 1. As shown in the figure, the address space has a typical size of 16 Mbyte and an address is assigned to each byte in the address space.

Each of the functional blocks has a fixed address in the address space of the CPU 2 without regard to which internal bus is connected to the functional block. It should be noted that the term data I/O means used in this specification include internal I/O registers in the EXDMAC 4, the DMAC 3, the timer 7, the SCI 9, the pulse output circuit 8, the ADC 10, the IOPA 21 to the IOPF 26 and the IOP1 31 to the IOP5 35, and the interrupt controller 11 shown in FIG. 1.

The ROM 5 has a typical size of 32 kbyte which is mapped onto addresses H'200000 to H'207FFF. On the other hand, the RAM 6 has a typical size of 1 k byte which is mapped onto addresses H'FFF800 to H'FFFBFF. The data I/O means are mapped into addresses H'FFFE00 to H'FFFFFF. It should be noted that the prefix H' appended to each address indicates that the address is represented in the hexadecimal format.

The data I/O means include data registers also referred to as buffer registers EXDiDRm which are a set of buffer registers used in a transfer of data controlled by the EXDMAC 4. The low-case character i in EXDiDRm denotes the number of a data-transfer channel and the low-case character m thereof denotes the number of a register. In actuality, these buffer registers EXDiDRm have different addresses assigned thereto. As will be described later, data can be read out from or written into the buffer registers EXDiDRm in any arbitrary order which is set by using a select signal output by the EXDMAC 4 or determined by the CPU 2. In addition, any of the data registers EXDiDRm can be used as either a source location or a destination location in control of a data transfer through the external buses EABUS and EDBUS executed by the EXDMAC 4.

Other address areas are treated as portions of the external address space. The vector of the CPU 2 is stored at the beginning of the address space. As described above, it is also necessary to connect an external ROM used for storing a program to the microcomputer 1. The address range allocated to the external ROM typically including the address range allocated to the vector is a portion of the external address space.

The external address space can be allocated at any time to external components such as the external ROM for storing a program, an external RAM for storing data and any other circuits (ASICs). The external address space is divided into 8 unit areas, namely, area 0 to area 7, each having a size of 2 MB. Bus specifications can be set for each of the 2-MB unit areas, allowing an area select signal to be output to select any one of the areas. The unit areas can be allocated to different memories with ease. In particular, area 2 to area 5 are typically allocated to a DRAM accessed through an address multiplexer or a DRAM interface allowing a high-speed page mode to be adopted. Bus control for such a configuration is described in a document published by Hitachi Corporation in March 1995 with a title of "H8S/2655 Series Hardware Manual."

In comparison with the external ROM, the embedded ROM 5 can be accessed at a high speed with ease. In addition, data read out from the embedded ROM 5 by the CPU 2 or the DMAC 3 is not output to the external bus. This is because, while an access is being made to an address mapped onto the embedded ROM 5 serving as an internal functional module, the bus controller 12 keeps the IOPD 24 and the IOPE 25 for inputting and outputting data in an operation-disabled state.

If the embedded ROM 5 is implemented by a mask ROM, changing the contents of the ROM 5 means modification of the whole microcomputer 1 which is difficult to change. If the embedded ROM 5 is implemented by an electrically programmable ROM such as a flash memory, however, the fabrication process becomes difficult, most likely raising the manufacturing cost to an undesirable level. On the other hand, while it is difficult to make an access to the external ROM at a high speed, the contents of the external ROM are easy to change since such a change entails only a modification of the external ROM alone. In addition, since the external ROM is a general-purpose memory, its price is low in many cases. A change in program may involve a change in program size which most likely entails a change in vector size. According to the address map shown in FIG. 2, the embedded ROM 5 is used for storing typically a program which needs to be executed at a high speed and is unlikely to be changed or a program whose contents are not supposed to be known by a third party whereas the external ROM is used for storing the remaining programs representing the whole processing including the vector of the CPU 2. As a result, the microcomputer 1 has an improved processing performance, offers a high degree of freedom to use and yet incurs a low manufacturing cost.

By setting a proper operating mode, the address range allocated to the embedded ROM 5 can be changed to area 0 which includes the address range allocated to the vector of the CPU 2. In such an operating mode, it is possible to configure a microcomputer system which does not require an external ROM for storing a program.

Figure 3:
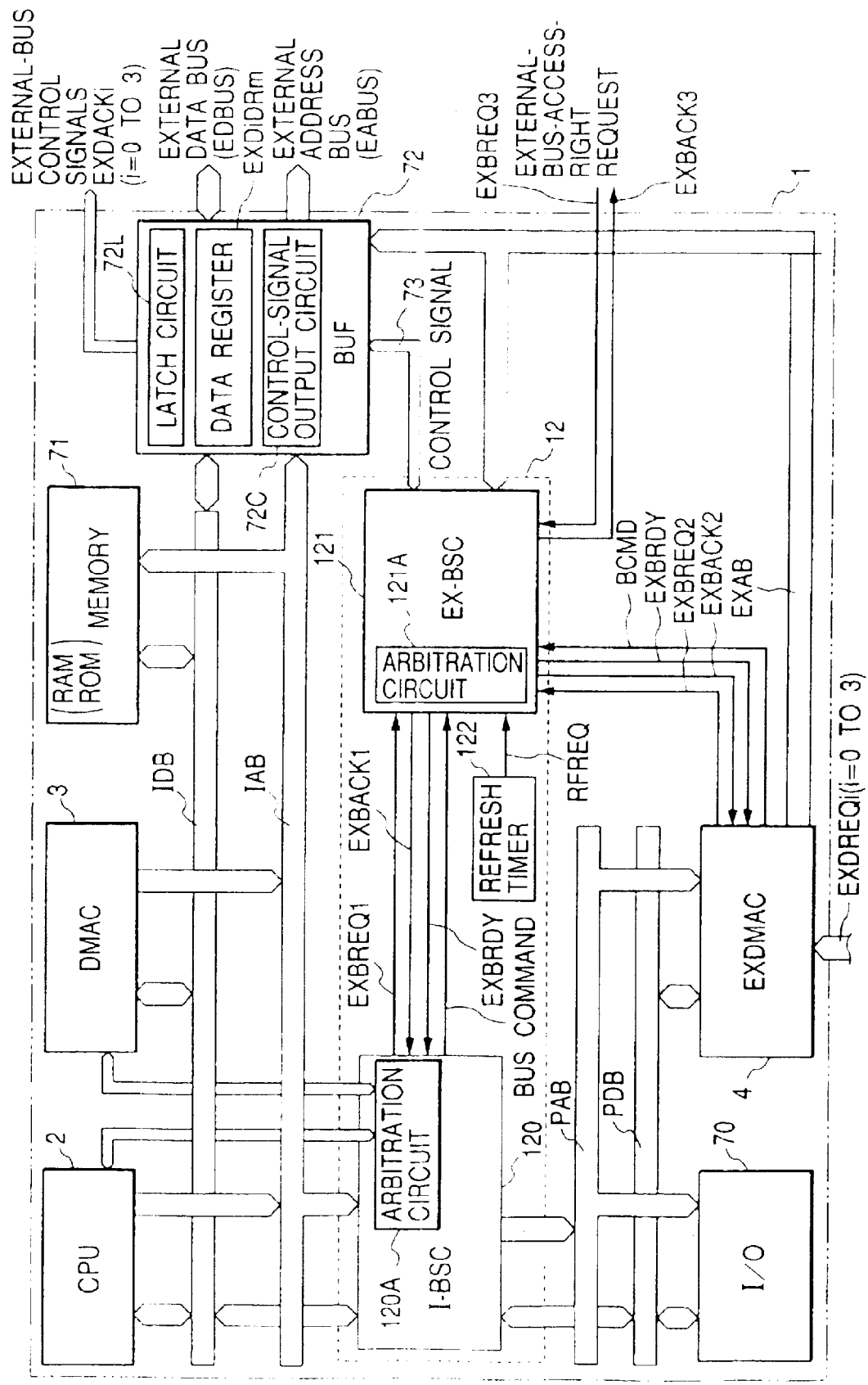
FIG. 3 is a block diagram showing a bus configuration of the microcomputer shown in FIG. 1 in detail.

FIG. 3 is a block diagram showing the bus configuration of the microcomputer 1 in more detail. As described above, the bus controller 12 has an internal-bus controller (I-BSC) 120, an external-bus controller (EX-BSC) 121 and the refresh timer 122. I/O means 70 shown in FIG. 3 include internal I/O registers of the timer 7, the pulse output circuit 8, the SCI 9, the ADC 10, the IOPA 21 to the IOPF 26, the IOP1 31 to the IOP5 35 and the interrupt controller 11 shown in FIG. 1. A memory 71 represents the ROM 5 and the RAM 6. Circuit modules and functional blocks not connected to the buses such as the CPG 13 are not shown in FIG. 3.

An external-bus buffer circuit (BUF) 72 represents components such as address and data buffers included in the IOPA 21 to the IOPF 26 and the IOP5 35. The IOPD 24 and the IOPE 25 are each provided with a latch circuit of the data bus. The latch circuits are represented by a circuit block denoted by reference numeral 72L. The external-bus buffer circuit (BUF) 72 also includes the data registers EXDiDRm which each serve as a buffer register.

The internal buses IDB and IAB are directly connected to the CPU 2 and the DMAC 3. In order increase the speed of an access to the internal memories such as the RAM 6 and the ROM 5, the memory 71 is also connected to the internal buses IDB and IAB. In this way, it takes only 1 state to make an access to the memory 71.

The internal buses IDB and IAB are also connected to registers of the functional blocks represented by the I/O means 70. By separating the buses IDB and IAB from the internal P buses PAB and PDB, the capacitive load of the internal buses IDB and IAB used by the CPU 2 mainly for fetching instructions of a program can be reduced and the processing speed can be increased. In addition, since the states of the unused internal P buses PDB and PAB can be sustained, the power consumption can also be reduced as well. The CPU 2 or another internal-bus master such as the DMAC 3 makes an access to a register of a functional block represented by the I/O means 70 connected to the internal P buses PAB and PDB through the internal buses IAB and IDB as well as the bus controller 12. It takes 2 states to make an access to a register of a functional block represented by the I/O means 70.

The CPU 2 or the DMAC 3 makes an access to an external memory connected to the external buses EABUS and EDBUS through the internal buses IAB and IDB as well as the external-bus buffer circuit 72. It should be noted that the external memory is not shown in FIG. 3.

In order for the CPU 2 and the DMAC 3 to occupy the internal buses IAB and IDB exclusively from each other, the CPU 2 and the DMAC 3 output bus-access-right request signals which are arbitrated by an arbitration circuit 120A employed in the internal-bus controller 120 to determine which of the CPU 2 and the DMAC 3 is to be granted a right to make an access to the internal buses IAB and IDB. Then, either the CPU 2 or the DMAC 3 confirms that such a right has been granted thereto before outputting an address signal to the internal bus IAB and a bus command to an internal control bus not shown in the figure. A bus command is a control code indicating typically a read or write operation and an access-data size such as a byte, a word or a long word.

The internal-bus controller 120 examines the address signal asserted on the internal bus IAB. If the address signal indicates an access to the memory 71, control of an access using the internal buses IAB and IDB is executed. If the address signal indicates an access to the internal I/O means 70, on the other hand, control of an access to a register employed in the internal I/O means 70 through the internal P buses PAB and PDB is executed.

The external buses EDBUS and EABUS are controlled by the external-bus controller 121 which also executes control of address multiplexing in case an external DRAM is connected to the external buses EDBUS and EABUS. Bus masters capable of using the external buses EDBUS and EABUS are the CPU 2, the DMAC 3, the EXDMAC 4, the refresh timer 122 and an external-bus master not shown in the figure. An arbitration circuit 121A employed in the external-bus controller 121 arbitrates requests for a right to make an access to the external buses EDBUS and EABUS made by these bus masters. In the case of the internal-bus masters such as the CPU 2 and the DMAC 3, their requests for a right to make an access to the internal buses IAB and IDB are first arbitrated by the internal-bus controller 120 which then outputs an external-bus-access-right request signal EXBREQ1 to the external-bus controller 121 to request a right to make an access to the external buses EDBUS and EABUS for one of the internal-bus masters which is determined by the internal-bus controller 20 to take precedence of the others. In other words, while an internal-bus master such as the CPU 2 or the DMAC 3 is occupying the internal buses IAB and IDB, no request for a right to male an access to the external buses EDBUS and EABUS is made by the other internal-bus masters. The external-bus controller 121 is capable of arbitrating requests for a right to make an access to the external buses EDBUS and EABUS made by the refresh timer 122 for performing a refresh operation and made by the EXDMAC 4 for carrying out a transfer of data through the external bus EDBUS and the request made by an internal-bus master by using the external-bus-access-right request signal EXBREQ1. In addition, even if an internal-bus master such as the CPU 2 or the DMAC 3 is occupying the internal buses IAB and IDB to carry out an internal operation, the refresh timer 122 is capable of refreshing the external DRAM by using the external buses EABUS and EDBUS, the EXDMAC 4 is capable of transferring data through the external bus EDBUS by using the external bus EABUS or a request for a right to make an access to the external buses EABUS and EDBUS made by a component external to the microcomputer 1 can be processed concurrently with the internal operation provided that this external-bus master has been granted by the external-bus controller 121 a right to make an access to the external buses EABUS and EDBUS. It should be noted that the external-bus controller 121 outputs an external-bus-access-right acknowledge signal EXBACK1 to the internal-bus controller 120 in response to the external-bus-access-right request signal EXBREQ1 to indicate that a right to make an access to the external buses EABUS and EDBUS is granted to an internal-bus master.

The refresh timer 122 outputs a refresh request signal RFREQ indicating a request for a refresh operation to the external-bus controller 121 at fixed time intervals. The request for a refresh operation is also a request for a right to make an access to the external buses EABUS and EDBUS. When such a right to make an access to the external buses EABUS and EDBUS is granted to the refresh timer 122, the external-bus controller 121 executes control to refresh the external DRAM such as the so-called CAS-before-RAS refresh control.

In addition, the external-bus controller 121 also receives an external-bus-access-right request signal EXBREQ3 requesting a right to make an access to the external buses EABUS and EDBUS from an external-bus master provided externally to the microcomputer 1. If such a right is granted to the external-bus master, the external-bus controller 121 puts external-address output lines, external-data input/output lines and external-access-control-signal input/output lines of the IOPA 21 to the IOPF 26 in a high-impedance state to put the external buses EABUS and EDBUS in a state of being usable by the external-bus master. At the same time, the external-bus controller 121 outputs an external-bus-access-right acknowledge signal EXBACK3 to the external-bus master making the request for a right to make an access to the external buses EABUS and EDBUS to notify the external-bus master that the request for the right is approved.

The EXDMAC 4 is connected to the internal P buses PAB and PDB through which an internal-bus master such as the CPU 2 or the DMAC 3 reads out or writes data from or into the EXDMAC 4 in order to set initial information such as a transfer control condition. The ESDMAC 4 starts an operation to control a DMA transfer as requested by a DMA-transfer-request signal EXDREQi where i=0 to 3 generated by an external component. Receiving such a request for a DMA transfer, the EXDMAC 4 outputs an external-bus-access-right request signal EXBREQ2 to the external-bus controller 121 to make a request for a right to make an access to the external buses EDBUS and EABUS. If the request is approved, the external-bus controller 121 outputs an external-bus-access-right acknowledge signal EXBACK2 to the EXDMAC 4. The EXDMAC 4 then outputs a external-bus command BCMD to the external-bus controller 121 and issues an external-bus address signal through the external-address internal bus EXAB. Then, the external-bus controller 121 executes control of a data transfer through the external buses EDBUS and EABUS by way of the external-bus buffer circuit 72 in accordance with the external-bus command BCMD and the external-bus address.

As described before, the IOPD 24 and the IOPE 25 are each provided with the latch circuit 72L serving as an external-bus buffer for temporarily storing transferred data in accordance with a command issued by the external-bus controller 121 in execution of control of a dual-address transfer for the EXDMAC 4. In execution of control of a single-address transfer, on the other hand, the external-bus buffer of the IOPD 24 or the IOPE 25 outputs a data acknowledge signal EXDACKi where i=0 to 3 to an input/output circuit serving as a data-transfer source or a data-transfer destination. To put it in detail, when the EXDMAC 4 outputs the external-bus command BCMD to the external-bus controller 11, the external-bus controller 11 outputs a control signal 73 to the external-bus buffer circuit 72 to drive a control-signal output circuit 72C to generate a data acknowledge signal EXDACKi where i=0 to 3. A data acknowledge signal EXDACKi where i=0 to 3 provided for a data-transfer channel of the EXDMAC 4 specifies an external device having an acknowledge-signal input pin as a data-transfer source or a data-transfer destination. Thus, the control-signal output circuit 72C can be regarded as a means for specifying an external device having an acknowledge-signal input pin as a data-transfer source or a data-transfer destination.

In a predetermined data transfer mode of a data transfer through the external buses EABUS and EDBUS controlled by the EXDMAC 4, one of the data registers EXDiDRm cited earlier can be specified as either a source location or a destination location of the data transfer.

It should be noted that the EXDMAC 4 and the bus controller 121 can also be built into a single unit.

Figure 4:
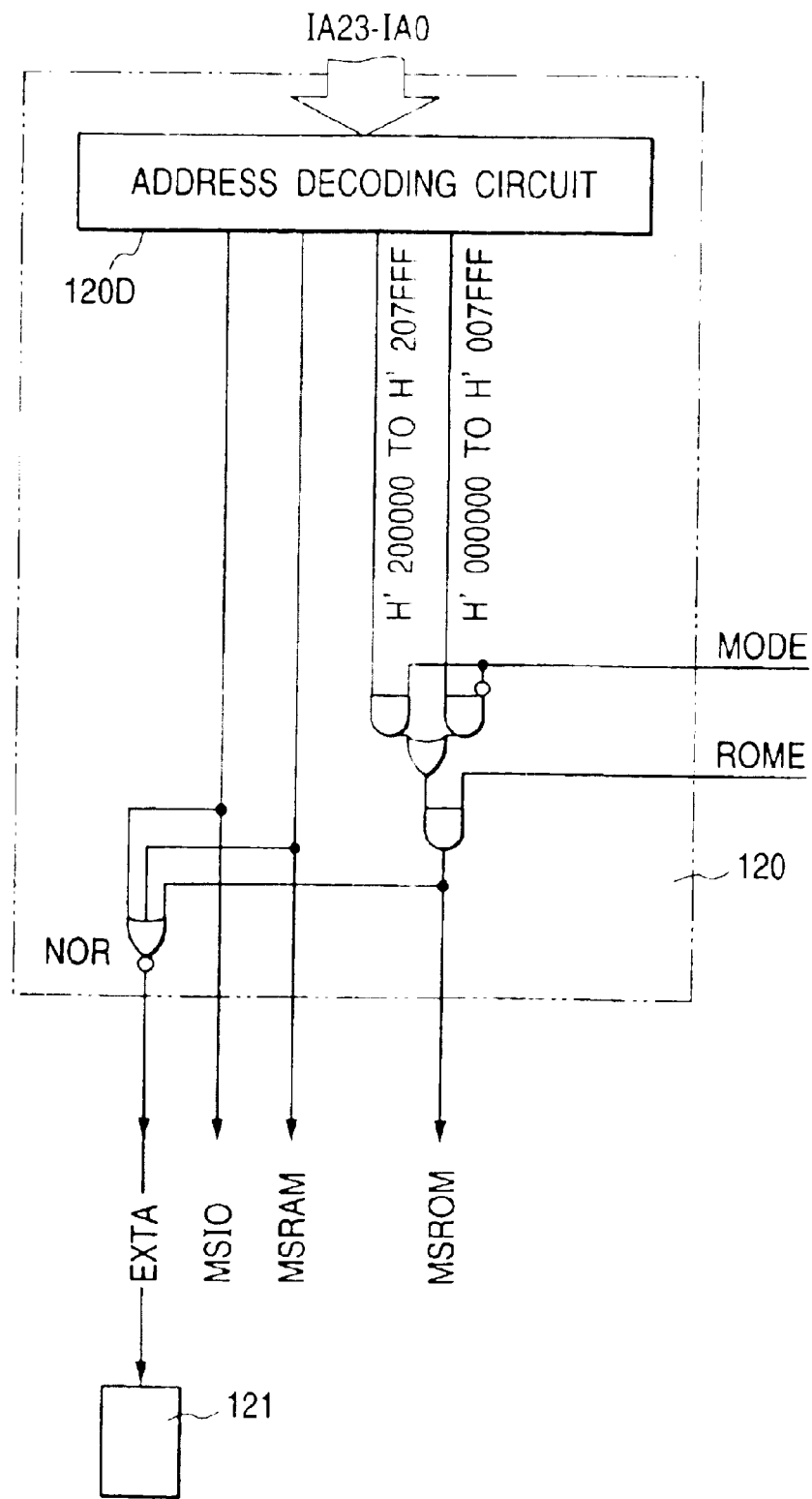
FIG. 4 is a block diagram showing a typical address decoding circuit included in an internal-bus controller of the microcomputer shown in FIG. 1.

FIG. 4 is a block diagram showing a typical address decoding circuit 120D included in the internal-bus controller 120. The address decoding circuit 120D decodes an address output by the CPU 2 or the DMAC 3 to the internal address bus IAB to recognize which of the ROM 5, the RAM 6, the I/O means 70 or a component in the external space is used as an accessed target. An MSROM signal, an MSRAM signal, an MSIO signal or an EXTA signal is activated as a select signal obtained as a result of address decoding to indicate that the ROM 5, the RAM 6, the I/O means 70 or a component in the external space respectively is recognized as an accessed target.

As described earlier, the ROM 5 can be mapped onto area 0 or 1 of the address map shown in FIG. 2 in dependence on the operating mode of the microcomputer 1. The ROM 5 can also be put in an unusable state by resetting a ROME signal shown in FIG. 4 at "0" through selection of a predetermined operating mode or specification of an internal I/O register.

When the I/O means 70 is selected by setting the MSIO signal at "1", an access to the internal P buses PAB and PDB is activated. When a component in the external address space is selected by setting the EXTA signal at "1", on the other hand, the EXTA signal is passed on to the external-bus controller 121 as the external-bus-access-right request signal EXBREQ1 cited earlier.

Figure 5:
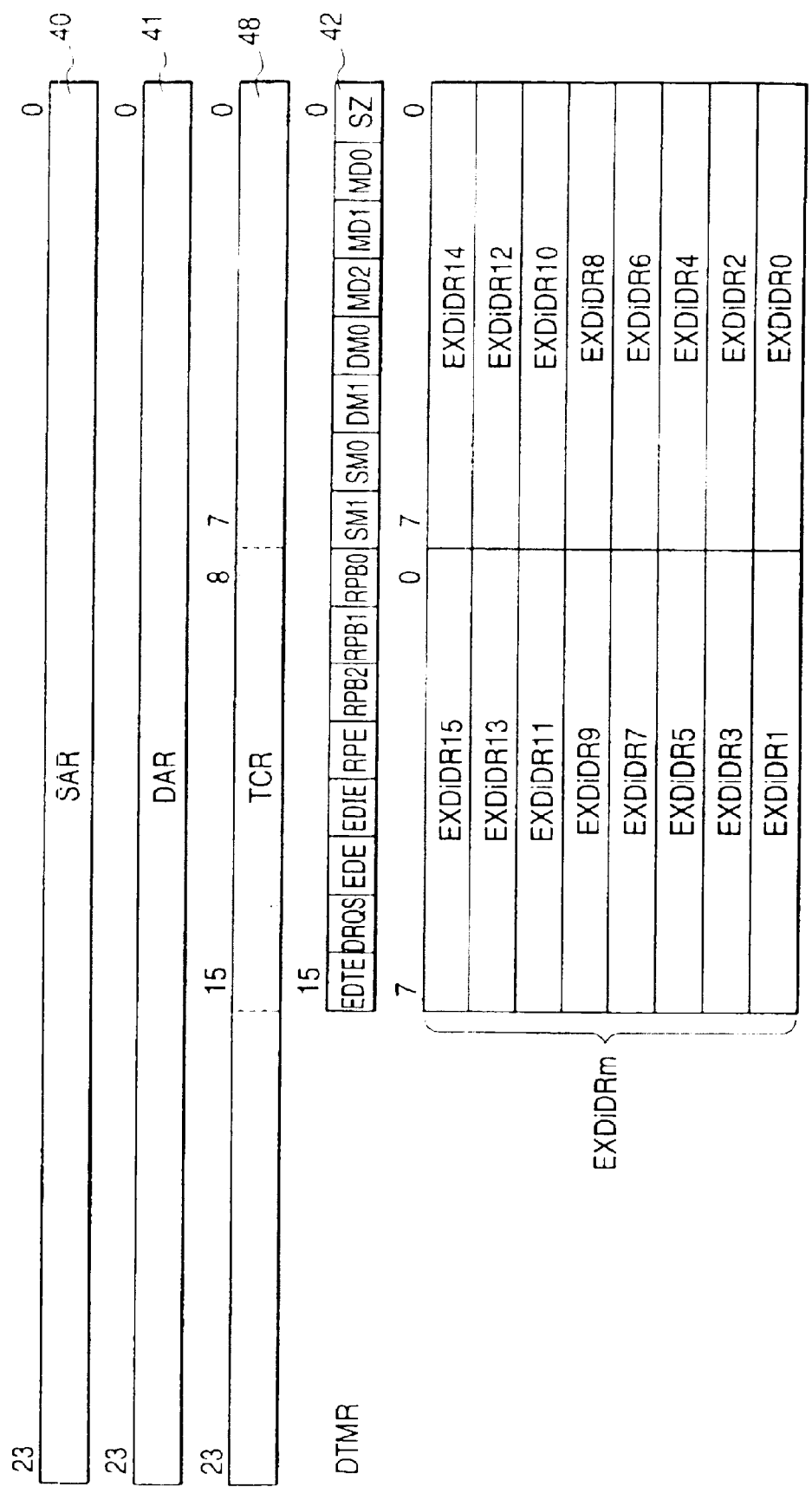
FIG. 5 is a diagram showing typical configurations of registers employed in an external-bus controller DMAC of the microcomputer shown in FIG. 1 for each data-transfer channel.

FIG. 5 is a diagram showing typical configurations of registers employed in the EXDMAC 4 for each data-transfer channel. Typically, the EXDMAC 4 has 4 data-transfer channels which are activated by external-bus request signals EXDREQi respectively where i=0 to 3 for carrying out a single-address or dual-address transfer of data.

As shown in FIG. 5, the registers employed in the EXDMAC 4 include a 24-bit source-address register (SAR) 40, a 24-bit destination-address register (DAR) 41, a 24-bit transfer-count register (TCR) 48 and a 16-bit mode register (DTMR) 42.

In addition, the EXDMAC 4 makes use of the 16-byte data registers EXDiDR0 to EXDiDR15 employed in the external-bus buffer circuit (BUF) 72 cited earlier as follows. When data is transferred in word units, 2 of the data registers EXDiDR0 to EXDiDR15 are combined to form a word unit. For example, the data registers EXDiDR0 and EXDiDR1 are combined with the former accommodating the low-order bits 0 to 7 of a word and the latter accommodating the high-order bits 8 to 15 of the word. The data registers EXDiDR0 to EXDiDR15 functionally employed in the external-bus buffer circuit (BUF) 72 shown in FIG. 3 are physically included in the IOPD 24 and IOPE 25.

When the EXDMAC 4 executes control of a data transfer by not using the data registers EXDiDR0 to EXDiDR15, the TCR 48 functions as a register used for setting the number of data units to be transferred. When the EXDMAC 4 executes control of a data transfer by using any of the data registers EXDiDR0 to EXDiDR15 as either the source location or the destination location of the data transfer, on the other hand, the TCR 48 functions as a buffer specification means for specifying any of the data registers EXDiDR0 to EXDiDR15 to be used in the transfer of data. As will be described in detail later, the high-order bits 8 to 15 (TCRH) of the TCR 48 can be used independently of the low-order bits 0 to 7 (TCRL) thereof.

The SAR 40 and the DAR 41 are address specification means for specifying 24-bit source and destination addresses respectively. Since the address specification means each have a length of 24 bits, any address in the 16-Mbyte address space can be specified. In a transfer of data with any of the data registers EXDiDR0 to EXDiDR15 used as either the source location or the destination location and a location in a memory used as the other location in the transfer of data, the address of the other location in the memory is specified in the SAR 40 or the DAR 41.

The function of each bit in the DTMR 42 is explained as follows. Bit 15 is an EDTE bit for enabling the operation of the EXDMAC 4. To be more specific, when the EDTE bit is set at "1", control of a data transfer for a data-transfer channel can be executed as requested by a signal EXDREQi associated with the channel.

Bit 14 is a DRQS bit for defining the activation state of a signal EXDREQi, that is, the level of the transfer-request signal EXDREQi which is regarded as an active state. To be more specific, if the DRQS bit is cleared to "0", the low level of the transfer-request signal EXDREQi is regarded as the active state. If the DRQS bit is set at "1", on the other hand, the high level of the transfer-request signal EXDREQi is regarded as the active state.

Bit 13 is an EDE flag. The EDE flag is set to "1" when a transfer of a predetermined number of units through a data-transfer channel is completed. That is, the EDE flag is set to "1" when the contents of the TCR 48 becomes "0".

Bit 12 is an EDIE bit indicating whether interrupts are enabled or disabled. If the EDE flag and the EDIE bit are both set at "1", the CPU 2 can be interrupted. When the EDE flag is set to "1" with the EDIE bit set at "1", the EDTE bit is cleared to "0" and the operation of the associated channel is suspended. In addition, the data-transfer channel is put in a state of waiting for processing carried out by the CPU 2 to be completed.

The EXDMAC 4 is capable of utilizing an object of transfer as a ring buffer. When an object of transfer is used as a ring buffer, the address of a data-transfer destination or a data-transfer source in the object of transfer is updated, being finally restored to an initial value after reaching a predetermined value. The address is restored finally to the initial value by setting a predetermined bit in the address as a border between fixed high-order bits and variable low-order bits. There is no special processing that needs to be carried out by the CPU 2 to restore the address to the initial value. A memory is used as a ring buffer by clearing the EDIE bit to "0".

Bit 11 is an RPE bit which is valid for MD2=1 to be described later. The RPE bit specifies a repeat operation. To be more specific, with the RPE bit set at "1", bits 0 to 7 (TCRL) of the transfer-count register TCR 48 function as a count register. As the value of bits 0 to 7 (TCRL) becomes equal to H'00, the value of bits 8 to 15 (TCRH) is transferred to bits 0 to 7 (TCRL) and the count operation by the TCRL is repeated. At that time, the EDE bit is not set to "1".

Bits 10 to 8 are RPB2 to RPB0 bits respectively which are valid for MD2=0 to be described later. The RPB0 to RPB2 bits specify the size of the ring buffer or the unit of repetition. To be more specific, the values of the RPB0 to RPB2 bits specify the magnitude of the repetition unit as follows.

| RPB2 to RPB0 | Repetition unit |
|---|---|
| B'000 | 64 kB |
| B'001 | 128 kB |
| B'010 | 256 kB |
| B'011 | 512 kB |
| B'100 | 1 MB |
| B'101 | 2 MB | where the prefix 'B appended to each value indicates that the value is expressed in the binary format. While the execution of the data-transfer control is being carried forward, an address processing unit 43 increments the contents of the SAR 40 and the DAR 41. However, a predetermined bit in the SAR 40 and the DAR 41 is selected as a block to prevent a carry or a borrow from being propagated by the address processing unit 43 to higher-order bits than the predetermined bit. The predetermined bit can be bit 15, 16, 17, 18, 19 or 20 corresponding to a repetition unit of 64 kB, 128 kB, 256 kB, 512 kB, 1 MB or 2 MB respectively in dependence whether the value of RPB0 to RPB2 bits is B'000, B'001, B'010, B'011, B'100 or B'101 respectively. With a carry or a borrow prevented from propagating to higher-order bits than the predetermined bit, the value of the higher-order bits is fixed and only the value of lower-order bits than the predetermined bit automatically changes in a sequential and repetitive manner. In this way, the EXDMAC 4 is capable of automatically controlling the address of an access target in a transfer of data so that the access target functions as a ring buffer. If the value of the RPB0 to RPB2 bits is set at B'110 r B'111, a carry or a borrow is allowed to propagate so that the count operation is not repeated.

Bits 7 and 6 are SM1 and SM0 bits respectively for specifying whether to increment, decrement or sustain the contents of the SAR 40 after a transfer of data. To be more specific, with the SM1 bit cleared to "0", the contents of the SAR 40 are sustained. With the SM1 bit set at "1" but the SM0 bit cleared to "0", the contents are incremented. With the SM1 bit set at "1" and the SM0 bit also set at "1", on the other hand, the contents are decremented.

Bits 5 and 4 are DM1 and DM0 bits respectively for specifying whether to increment, decrement or sustain the contents of the DAR 41 after a transfer of data. To be more specific, with the DM1 bit cleared to "0", the contents of the DAR 41 are sustained. With the DM1 bit set at "1" and the DM0 bit cleared to "0", the contents are incremented. With the DM1 bit cleared to "0" but the DM0 bit set at "1", the contents are decremented.

Bits 3 to 1 are MD2, MD1 and MD0 bits respectively for selecting a data-transfer mode. To be more specific, with the MD2 bit set at "1", one of the data registers EXDiDR0 to EXDiDR15 used by the EXDMAC 4 is specified as a source or destination location. One of the data registers EXDiDR0 to EXDiDR15 is specified by the value of the 4 lowest-order bits of the TCR 48 for SZ=0 or the left-shifted value of the 3 lower-order bits of the TCR 48 for SZ=1. It should be noted that an SZ bit will be described later.

With the MD0 bit cleared to "0", the specified one of the data registers EXDiDR0 to EXDiDR15 is used as the source of a data transfer. With the MD0 bit set at "1", on the other hand, the specified one of the data registers EXDiDR0 to EXDiDR15 is used as the destination of a data transfer. In this case, only one data access can be made without regard to the value of the MD1 bit. With the MD1 bit cleared to "0", an ordinary read or write operation is carried out. With the MD1 bit set at "1", on the other hand, a read or write operation based on an acknowledge signal is carried out.

With the RPE bit set at "1", the TCR 48 is functionally divided into a TCRH comprising bits 15 to 8 and a TCRL comprising bits 7 to 0. It is the TCRL that is used as a transfer counter. In this case, as the contents of the TCRL become 0, the contents of the TCRH are copied to the TCRL. Thus, if the contents of the TCRL and TCRH are set at the same value, one of the data registers EXDiDR0 to EXDiDR15 is used repeatedly in the same manner.

If the MD2 bit is cleared to "0", on the other hand, the following holds true. If the MD1 bit is cleared to "0", the dual-address mode is adopted. In the dual-address mode, data is transferred from an address indicated by the SAR 40 to and address indicated by the DAR 41 only once. Strictly speaking, data accesses are made twice. The first access is made to read out the data from the address indicated by the SAR 40 and the second access is made to write the data into the address indicated by the DAR 41. Afterwards, the contents of SAR 40 and the DAR 41 are updated in accordance with values set in the SM1, SM0, DM1 and DM0 bits whereas the contents of the TCR 48 are decremented.

If the MD1 bit is set at "1", the single-address mode is adopted. In the single-address mode, either the destination or the source of a data transfer is specified by the acknowledge signal.

With the MD0 bit cleared to "0", the destination of the data transfer is specified by the acknowledge signal while the data-transfer source is indicated by an address stored in the SAR 40.

With the MD0 bit set at "1", on the other hand, the source of the data transfer is specified by the acknowledge signal while the data-transfer destination is indicated by an address stored in the DAR 41.

Data is transferred by making 2 accesses. The first access is made to read out the data from the source of the data transfer and the second access is made to write the data into the data-transfer destination. Afterwards, the contents of SAR 40 and the DAR 41 are updated in accordance with values set in the SM1, SM0, DM1 and DM0 bits whereas the contents of the TCRT are decremented.

Bit 0 is the SZ bit cited earlier. The SZ bit indicates whether the size of the transfer unit is a byte or a word. To be more specific, an SZ bit cleared to "0" indicates that data is transferred in-bytes. On the other hand, an SZ bit set at "1" indicates that data is transferred in words. It should be noted that a word is composed of 2 bytes.

Figure 6:
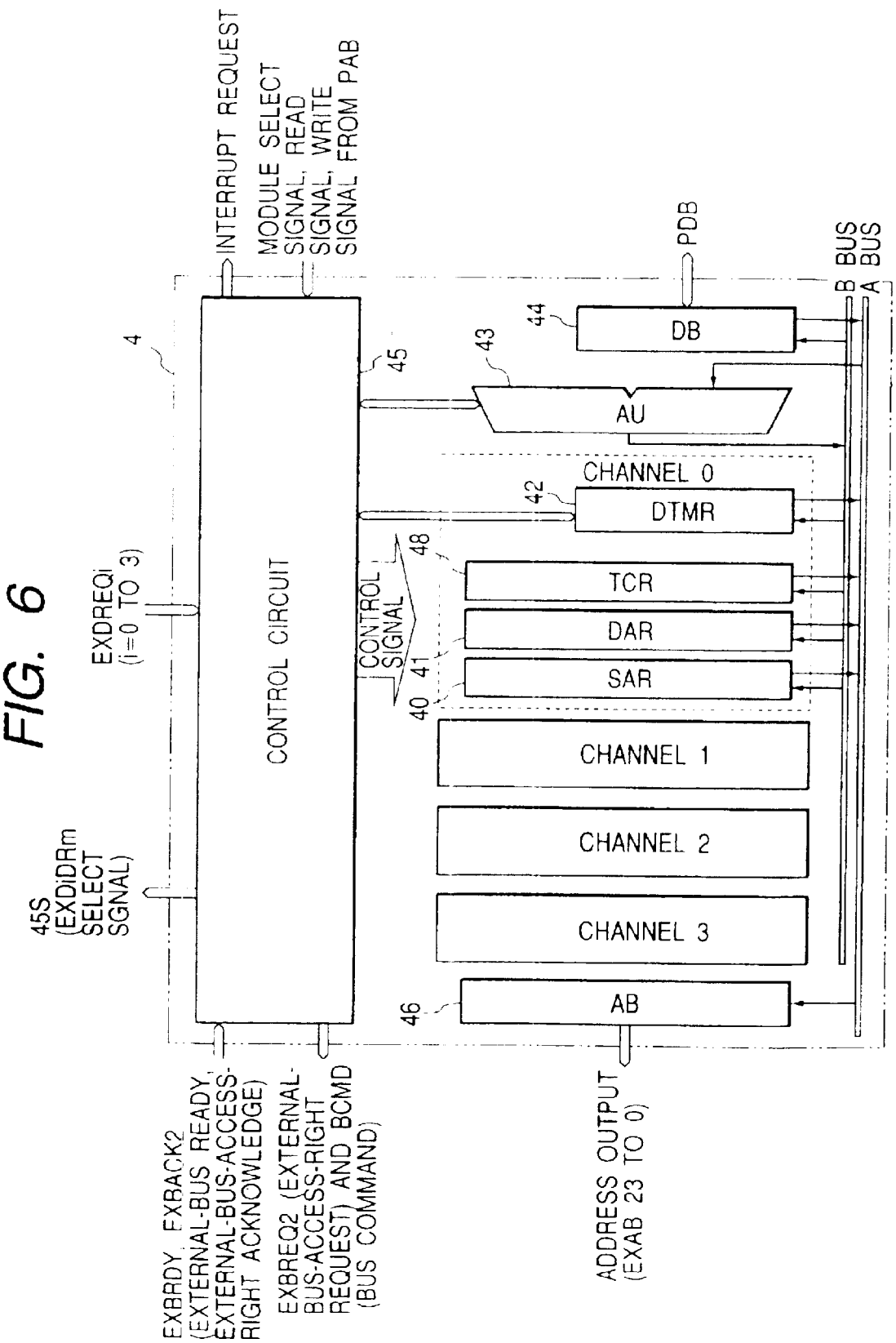
FIG. 6 is a block diagram showing the external-bus controller DMAC as a whole.

FIG. 6 is a block diagram showing the EXDMAC 4 as a whole. A control circuit 45 employed in the EXDMAC 4 receives activation request signals EXDREQi where i=0 to 3 from external components. In addition, the control circuit 45 also outputs the external-bus-access-right request EXBREQ2, an external-bus command BCMD and an address to the external-bus controller 121 and receives the external-bus-access-right acknowledge signal EXBACK2 and an external-bus ready signal EXBRDY from the external-bus controller 121. As described earlier, a data acknowledge signal EXDACKi shown in FIG. 3 where i=0 to 3 generated by the external-bus buffer circuit 72 for a data-transfer channel of the EXDMAC 4 specifies an external device having an acknowledge signal input pin as a data-transfer source or a data-transfer destination. The data acknowledge signal EXDACKi used in a single-address transfer of data is generated typically in accordance with the external-external-bus command BCMD output to the external-bus controller 121 which in turn outputs a control signal 73 to the external-bus buffer circuit 72. A negated state of the external-bus ready signal EXBRDY can be interpreted as a command issued by the external-bus controller 121 to the EXDMAC 4 to request the EXDMAC 4 to enter a wait state. This interpretation holds true of the signal EXBRDY output by the external-bus controller 121 to the internal-bus controller 120.

Furthermore, the control circuit 45 also outputs a select signal 45S to select a register EXDiDRm and generates the number of a data-transfer channel through which an operation is requested and a count value to be set in the TCR 48 of the data-transfer channel.

Moreover, in order for the EXDMAC 4 to interface with the CPU 2 and the DMAC 3 employed in the microcomputer 1, the control circuit 45 inputs a module select signal, a read signal and a write signal from the internal-bus controller 120. The EXDMAC 4 is connected to the internal P address bus PAB and the internal P data bus PDB.

In the dual-address mode, the general-purpose DMAC 3 temporarily stores data read out from the source of a data transfer before writing the data into the data-transfer destination. In the case of the EXDMAC 4, on the other hand, the facilities of input/output ports are used as a substitute for the facility to temporary store data being transferred. To put it concretely, the latch circuits 72L of the IOPD 24 and the IOPE 25 are each provided with a temporary storing function. As the speed of the operation of a microcomputer 1 increases, a pipeline operation becomes indispensable. For example, an operation to read out or write data in a transfer of data with the DMAC 3 obtaining a bus-access right by itself is followed by an operation carried out by the CPU 2 to read out and write data from and into the DMAC 3 in order to set a data-transfer control condition in the DMAC 3. In this case, there is a difficult transition from an operation with the DMAC 3 serving as a bus master to an operation with the DMAC 3 used as a bus slave. It is quite within the bounds of possibility that such a difficult transition causes an operation uncompleted within a predetermined number of states or causes an undesirable state. In the case of the EXDMAC 4, these problems can be basically solved by using facilities of input/output ports as a substitute for the facility of the EXDMAC 4 serving as a bus master with respect to at least operations to input and output data. While a transfer of data is being controlled by the EXDMAC 4, the CPU 2 is capable of making an access to the EXDMAC 4 by using the internal buses. Thus, the CPU 2 is capable of reading out data from a register employed in the EXDMAC 4 with any arbitrary timing to monitor the state of the EXDMAC 4 with ease.

The EXDMAC 4 is intended to serve as a component for transferring data independently of the CPU 2. If data read out from the source of a data transfer must be temporarily stored in the controller module itself in a dual-addressing mode for example, it will be necessary to provide a dedicated data bus. In the case of the EXDMAC 4, however, such a data bus is not required. As a result, the physical scale of the microcomputer 1 can be reduced accordingly.

As shown in FIG. 6, the EXDMAC 4 comprises circuit blocks such as the registers, namely, the DTMR 42, the DAR 41, the SAR 40 and the TCR 48 for each of the 4 data-transfer channels, and transfer control means including the control circuit 45, a data buffer (DB) 44, an address buffer (AB) 46 and an arithmetic-processing circuit (AU) 43 which are common to the data-transfer channels. The circuit blocks are connected to each other by 2 internal buses, namely, A and B buses.

The control circuit 45 detects an activation request signal EXDREQi where i=0 to 3, starting an operation. The control circuit 45 then outputs the external-bus-access-right request EXBREQ2, an external-bus command BCMD and an address to the external-bus controller 121, and receives the external-bus-access-right acknowledge signal EXBACK2 and an external-bus ready signal EXBRDY from the external-bus controller 121 to carry out an operation using the external buses EABUS and EDBUS. On the other hand, the control circuit 45 also reads out and writes data from and into the registers thereof in accordance with the module select signal, the read signal, the write signal, the low-order bits of an address on the internal P address bus PAB and a value on the internal P data bus PDB.

The address buffer 46 has a width of 24 bits corresponding to 16 Mbytes of the external address space. The address buffer 46 receives address data from the internal bus A and holds the address data at which data is to be written or read out. The address is output as an address signal to the external-address internal bus EXAB.

The data buffer 44 has a width of 16 bits and is connected to the internal P data bus PDB. The CPU 2 reads out and writes data from and into a register in the EXDMAC 4 through the data buffer 44. Having a width of 24 bits, an access to the SAR 40 or the DAR 41 made by the CPU 2 is converted into 2 accesses to the data buffer 44. However, the internal access to the SAR 40 or the DAR 41 is made only once to avoid an undesirable operation.

The functions of the SAR 40, the DAR 41 and the DTMR 42 have been described earlier. Data is input from the internal bus A and output to the internal bus B. With the RPE bit set at "1", the TCR 48 is functionally divided into a TCRH comprising bits 15 to 8 and a TCRL comprising bits 7 to 0. It is the TCRL that is used as a transfer counter. In this case, as the contents of the TCRL become 0, the contents of the TCRH are copied to the TCRL.

The arithmetic-processing circuit (AU) 43 carries out increment/decrement processing. By the same token, data is input from the internal bus A and output to the internal bus B.

It should be noted that a separate bus may be provided to connect the data buffer 44 to each of the registers to facilitate operations carried out by the CPU 2 to read out and write data from and into the registers.

Figure 7:
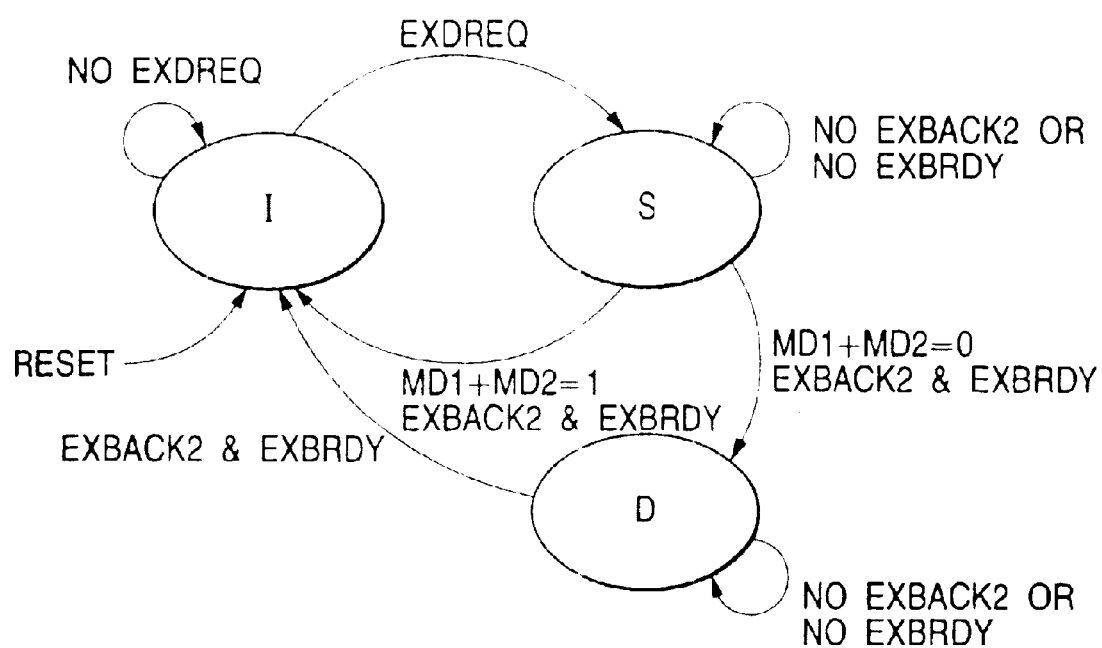
FIG. 7 is a diagram showing state transitions of the external-bus controller DMAC.

FIG. 7 is a diagram showing state transitions of the EXDMAC 4. As shown in the figure, the EXDMAC 4 has 3 states, namely, an I (idle) state, an S (source-transfer) state and a D (destination-transfer) state.

When the EXDMAC 4 is reset, it enters the I state. In the I state, the EXDMAC 4 samples the activation request signals EXDREQi where i=0 to 3. A detected input activation request signal EXDREQi of a data-transfer channel causes the EDTE bit of the data-transfer channel to be set at "1". If a plurality of data-transfer channels are activated, a data-transfer channel with a lowest number takes precedence of the others. That is, data-transfer channel 0 has the highest priority level.

When the activation request signal EXDREQi is put back in an active state, the EXDMAC 4 enters the S state. In the S state, the contents of the SAR 40 of the active data-transfer channel are output to the external-address internal bus EXAB and then the contents of the SAR 40 are updated in accordance with the SM1 and SM0 bits. At the same time, the external-bus request signal EXBREQ2 and the external-bus command BCMD are output to the external-bus controller 121. With the MD2 bit set at "1" but the MD0 bit cleared to "0", a data register EXDiDRm is used in place of the SAR 40. In this case, the external-bus command BCMD includes information showing the single-address mode and control information of the latch circuit and the data register EXDiDRm.

The external-bus controller 121 arbitrates requests for a right to make an access to the external buses EABUS and EDBUS and activates the acknowledge signal EXBACK2 with predetermined timing in order to notify the EXDMAC 4 that a right to make an access to the external buses EABUS and EDBUS is granted and starts the operation of the external buses EABUS and RDBUS. In addition, with the MD2 bit set at "1" but the MD0 bit cleared to "0", the contents of a specified one among the data registers EXDiRD0 to EXDiDR15 are output to the external data bus EDBUS. As the operation of the external buses EABUS and EDBUS is completed, the external-bus ready signal EXBRDY is put in an active state to end a bus cycle in the S state of the EXDMAC 4.

With the MD1 or MD2 bit set at "1" in the S state, the EXDMAC 4 ends the operation in the S state, transiting to the I state when the EXDMAC 4 detects an active external-bus ready signal EXBRDY with the bus-access-right-request acknowledge signal EXBACK2 put in an active state. States with the MD1 or MD2 bit set at "1" are a state with the MD2 bit cleared to 0 but the MD1 bit set at "1", a state with the MD1 bit cleared to 0 but the MD2 bit set at "1" and a state with both the MD2 and MD1 bits set at "1". A state with the MD2 bit cleared to 0 but the MD1 bit set at "1" corresponds to the single-addressing mode using none of the data registers EXDiDRm. A state with the MD1 bit cleared to 0 but the MD2 bit set at "1" corresponds to the dual-addressing mode using a data register EXDiDRm. A state with both the MD2 and MD1 bits set at "1" corresponds to the single-addressing mode using a data register EXDiDRm.

With the MD1 or MD2 bit cleared to "0" in the S state, the EXDMAC 4 ends the operation in the S state, transiting to the D state when the EXDMAC 4 detects an active external-bus ready signal EXBDRY with the bus-access-right-request acknowledge signal EXBACK2 put in an active state. A state with both the MD2 and MD1 bits cleared to "0" corresponds to the dual-addressing mode using none of the data registers EXDiDRm. At that time, data read out from a source location in the S state is supplied to the latch circuits 72L of the IOPD 24 and the IOPE 25. In the D state, the contents of the DAR 40 of the active data-transfer channel are output to the external-address internal bus EXAB and then the contents of the DAR 41 are updated in accordance with the DM1 and DM0 bits. At the same time, the external-bus request signal EXBREQ2 and the external-bus command BCMD are output to the external-bus controller 121 which then starts the operation of the external buses EABUS and EDBUS.

As the operation using the external buses EABUS and EDBUS is completed, the external-bus ready signal EXBRDY is put in an active state. When the EXDMAC 4 detects an active external-bus ready signal EXBRDY with the bus-access-right-request acknowledge signal EXBACK2 put in an active state, the EXDMAC 4 terminates the access cycle, transiting to the I state.

It should be noted that, in the case of the single-address mode, the control circuit 45 provides an instruction to put the transfer-acknowledge signal EXDACKi in an active state by using the external-bus command BCMD of the S state. In the case of the dual-address mode, on the other hand, the control circuit 45 provides an instruction not to relinquish the right to make an access to the external buses EABUS and EDBUS after the read operation and an instruction to temporarily hold data read out from a data-transfer source in the latch circuits 72L of the IOPD 24 and the IOPE 25 by using the external-bus command BCMD in the S state. By the same token, input/output operations from and to the registers EXDiDRm are also requested.

Figure 8:
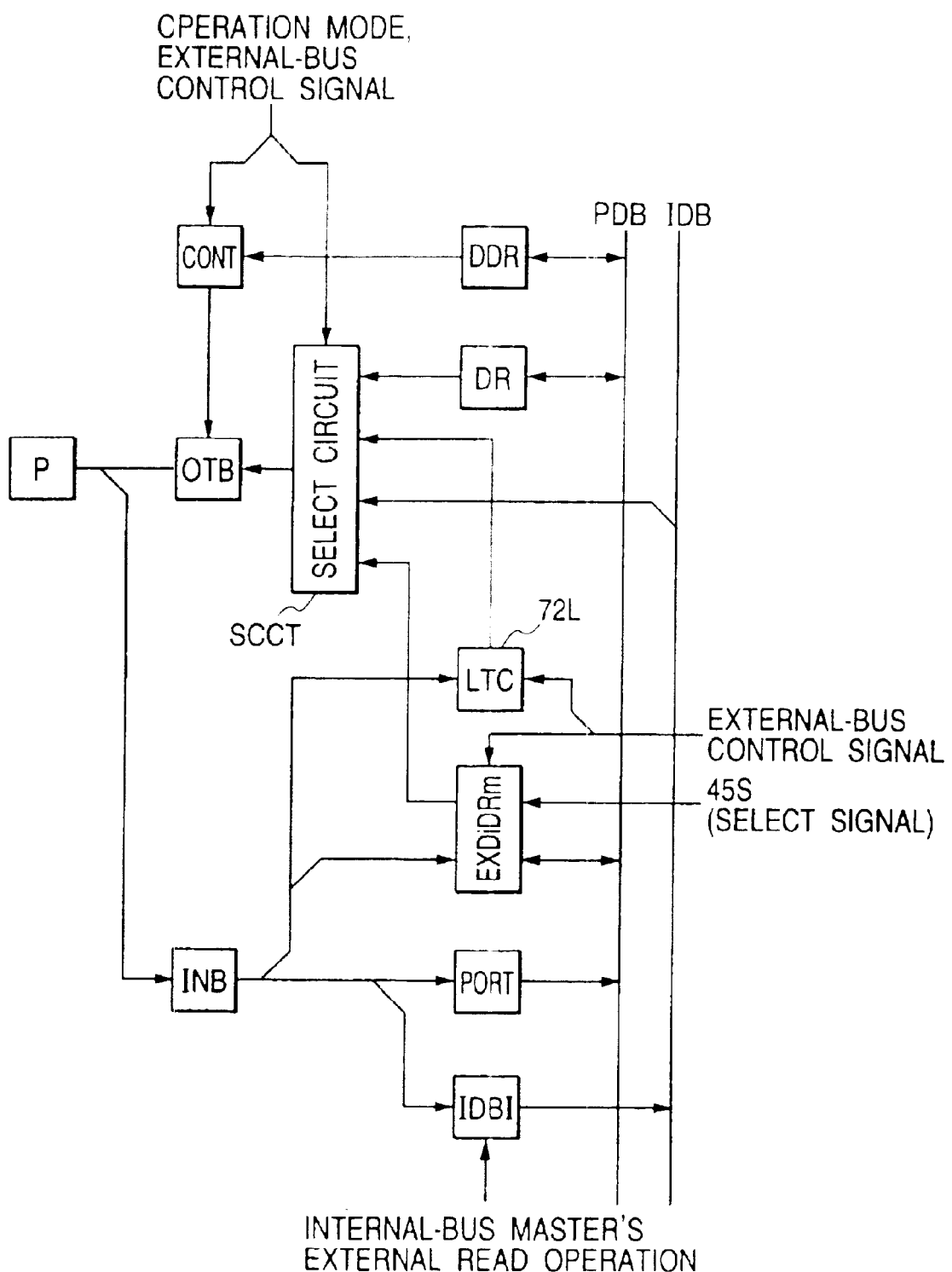
FIG. 8 is a diagram showing a typical configuration of an I/O port in a simple and plain manner.

FIG. 8 is a diagram showing a typical configuration of the I/O port (input/output circuit) IOPD 24 or the IOPE 25 in a simple and plain manner. An address system of the IOPD 24 or the IOPE 25 is omitted from the figure.

As basic functions, an I/O port is provided with functions of a data direction register DDR, an output data register DR and an input data register PORT. An I/O port also has a data-bus function to input and output data from and to the internal data bus IDB. In addition, an I/O port also includes a latch circuit (LTC) 72L and a data register EXDiDRm. The data register EXDiDRm inputs and outputs data from and to an external-bus pin (pad) P during a transfer of the data controlled by the EXDMAC 4. The data register EXDiDRm inputs and outputs data from and to the internal P data bus PDB during a read or write operation carried out by the CPU 2.

The data direction register DDR controls an output buffer OTB through a control circuit CONT. The output buffer OTB is controlled by the operating mode, an external-bus control signal and the data direction register DDR. In a single-chip mode, the external data bus EDBUS is not used. Thus, input and output operations carried out by the I/O port are controlled by the data direction register DDR. In an extension mode, on the other hand, the external data bus EDBUS is not used. Thus, data is output in a write operation other than the single-address mode by the external-bus control circuit independently of the data direction register DDR.

A select circuit SCCT selects the data register DR, the internal data bus IDB, the latch circuit 72L or the buffer register EXDiDRm as a destination to which data is to be output in accordance with the operating mode, the external-bus control signal and the data direction register DDR. In a single-chip mode, the external data bus EDBUS is not used. Thus, the data register is selected as an I/O port. In an extension mode, on the other hand, the internal data bus IDB is selected in an external write operation of an internal-bus master. The latch circuit 72L is selected in a write operation in a dual-address mode of the EXDMAC 4. A buffer register EXDiDRm is selected in an operation to write data from the data register DR to the external bus EDBUS controlled by the EXDMAC 4. The EXDiRDm that is used is selected by a select signal 45S including a data-transfer channel number and the value of a predetermined plurality of bits in the transfer-count register output by the EXDMAC 4.

The state of an input P is propagated by way of an input buffer INB as follows. When an internal-bus master reads out data from the I/O port, the data is output from the input-data register PORT to the internal P bus PDB. When an internal-bus master carries out an external read operation, data is output from the input data buffer IDBI to the internal data bus IDB. When the EXDMAC 4 carries out an operation to read data in the dual-address mode, the data is supplied to the latch circuit 72L. When the EXDMAC 4 inputs data from the external data bus EABUS, the data can be stored in the buffer register EXDiDRm.

It should be noted that external-bus control signals are generated by the external-bus controller 121 on the basis of, among other information, a external-bus command BCMD output by the EXDMAC 4 or the internal-bus controller 120. In the case of an external data bus EDBUS used for transferring both 8-bit data and 16-bit data, the external-bus control signals include a signal for controlling the width of the external data bus EDBUS. For example, data is transferred from an 8-bit space to a 16-bit space through the external data bus EDBUS in 2 consecutive bus cycles. Data read into the IOPD 24 is supplied to the latch circuit 72L sequentially in byte units. In a write operation, on the other hand, control is executed to supply data stored in the latch circuit 72L as a batch to the IOPD 24 and the IOPE 25.

Figure 9:
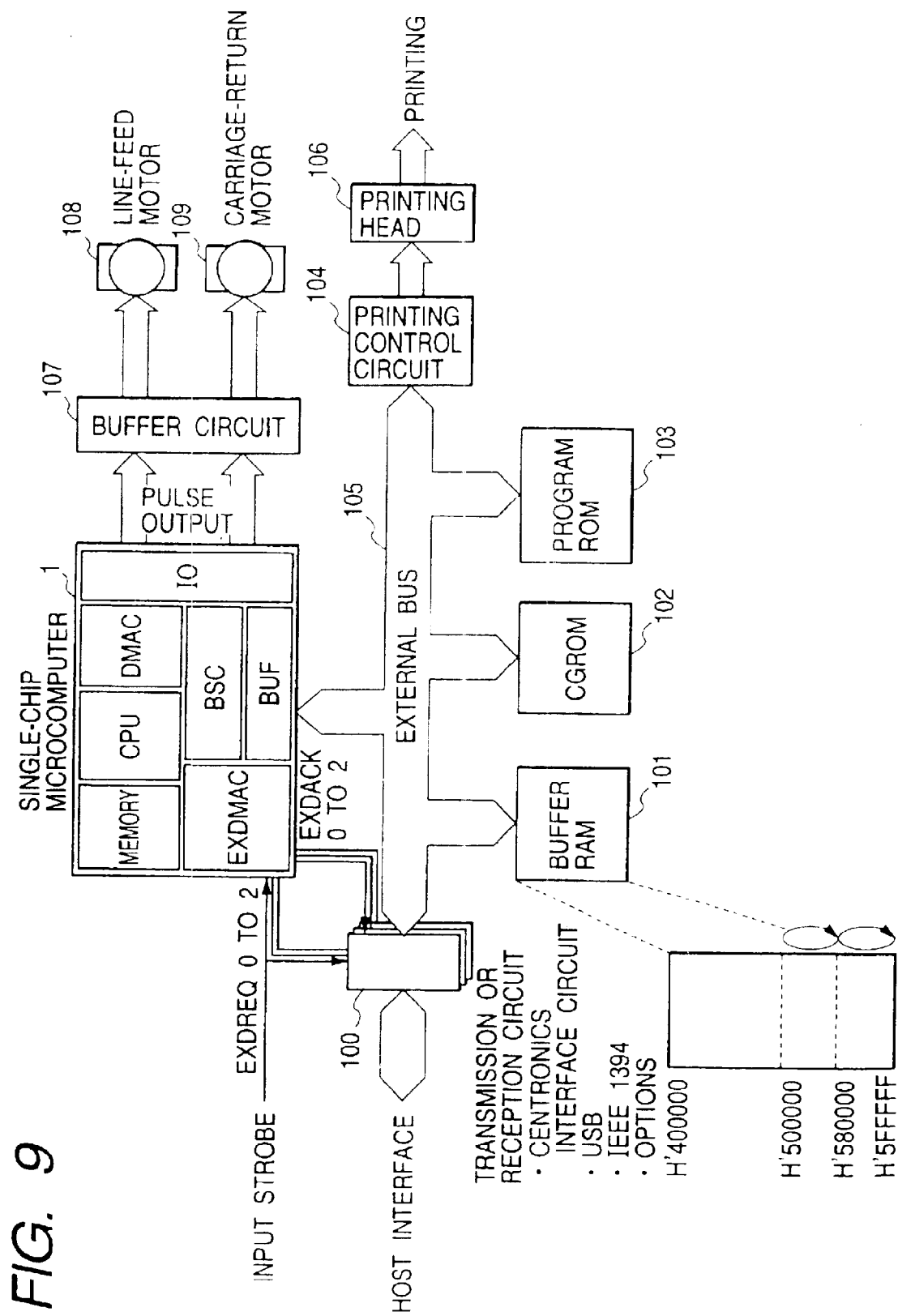
FIG. 9 is a diagram showing a typical microcomputer system including the microcomputer shown in FIG. 1 as used in control of a printer.

FIG. 9 is a diagram showing a typical microcomputer system including the described microcomputer 1 used in control of a printer.

As shown in the figure, in addition to the single-chip microcomputer 1, the printer control system includes a plurality of communication circuits 100 such as a Centronics interface, an IEEE1394 universal serial bus (USB) and an optional component, a buffer RAM 101 implemented by a DRAM, a character-generation ROM (CGROM) 102, a program ROM 103 and a printing control circuit 104 which are connected to the microcomputer 1 by an external bus 105.

Areas 0, 2 and 6 of the address map shown in FIG. 2 are allocated to the program ROM 103, the buffer RAM 101 and the CGROM 102 receptively. Area 7 is allocated to the communication circuits 100 and the printing control circuit 104. As described above, the buffer RAM 101 is implemented by a DRAM. A DRAM is a memory which allows data to be written into and read out from. Even though a DRAM requires refresh operations, the DRAM is inexpensive. FIG. 9 also shows a range of addresses assigned to the buffer RAM 101. In this typical printer control system, the buffer RAM 101 has a storage capacity of 2 MB or 16 Mbits. An area of 1 MB in the buffer RAM 101 is used as a work area of the CPU 2. The rest is used as ring buffers each having a size of 512 kB.

The printer control system shown in FIG. 9 further has a printing head 106, a buffer circuit 107, a line-feed motor 108 and a carriage-return motor 109. The line-feed motor 108 and the carriage-return motor 109 are controlled by signals output by the timer 7 and the pulse output circuit 8 which are employed in the microcomputer 1 as described above. The line-feed motor 108 and the carriage-return motor 109 are each typically implemented by but not limited to a stepping motor.

The SCI 9 and the ADC 10 which are employed in the microcomputer but not shown in FIG. 9 serve as a means of communication with a host apparatus and a means for inputting information output by a sensor such as the number of printed pages.

The EXDMAC 4 receives data from the communication circuits 100 such as a Centronics interface, an IEEE1394 universal serial bus (USB) and an optional component concurrently with processing carried out by the CPU 2. The microcomputer 1 is capable of transferring data in a single-address mode by generating a transfer-acknowledge signal EXDACKi in response to a transfer-request signal EXDREQi supplied to the microcomputer 1. Typically, an input strobe signal generated by the Centronics interface is supplied to the microcomputer 1 as the transfer-request signal EXDREC0 making a request for a transfer of data using data-transfer channel 0 in a dual-address mode. The transfer-request signal EXFREQ0 is responded by a transfer-acknowledge signal EXDACK0 indicating that the request is granted. On the other hand, a reception signal from the optional component is used as the transfer-request signal EXDREQ1 making a request for a transfer of data using data-transfer channel 1 in a single-address mode. The transfer-request signal EXFREQ1 is responded by a transfer-acknowledge signal EXDACK1 indicating that the request is granted.

Prior to a transfer of actual data, transfer control information such as a packet command is transferred to the data register EXDiDRm of the EXDMAC 4. The CPU 2 analyzes the information and, if a result of the analysis indicates that data is to be received continuously from the immediately preceding transfer of data, the MD2 bit is cleared to "0" and the TCR 48 is set to activate another transfer of data.

When the host apparatus reads out the status of the printer, the CPU 2 writes the data of the status from the registers EXD2DR0 and EXD2DR1 of data-transfer channel 2 sequentially to be transferred to the communication circuit 100 by activating the transfer-request signal EXDREQ2. The communication circuit 100 then transmits the status to the host apparatus. For example, the CPU 2 sets status indicating a wait for transfer control information in the registers EXD2DR0 and EXD2DR1. As a packet command containing transfer control information is transmitted by the host apparatus in response to the status, the CPU 2 sets busy status in the registers EXD2DR0 and EXD2DR1 and then analyzes the transfer control information. As the analysis of the transfer control information and the setting of the EXDMAC 4 are completed, the CPU 2 again sets status indicating a wait for other transfer control information in the registers EXD2DR0 and EXD2DR1. The host apparatus transmits the other transfer control information and data while checking the status.

The internal DMAC 3 outputs data to be printed and pulse data for driving the line-feed motor 108 and the carriage-return motor 109. The DMAC 3 also transfers data to and from the SCI 9. A method of using the DMAC 3 is described in Japanese Patent Laid-open No. Hei 5-307516.

It should be noted that, with the integration scale of the semiconductor integrated circuit becoming larger, it becomes possible to integrate portions or all of the communication circuits 100 except the optional components and the printing control circuit 104 in the same chip as the microcomputer 1. In addition, the general-purpose memory such as the buffer RAM 101 can also be integrated in the same chip as the microcomputer 1. On the other hand, it is recommended to integrate a component with a function varying from microcomputer system to microcomputer system in a chip separated from the chip of the microcomputer 1. Examples of such a component are the program ROM 103 and the CGROM 102 which are peculiar to the type of the individual printer. However, the logical configuration of the buses remains the same without regard to which portion of the printing control system is integrated in the same chip as the microcomputer 1.

Figure 10:
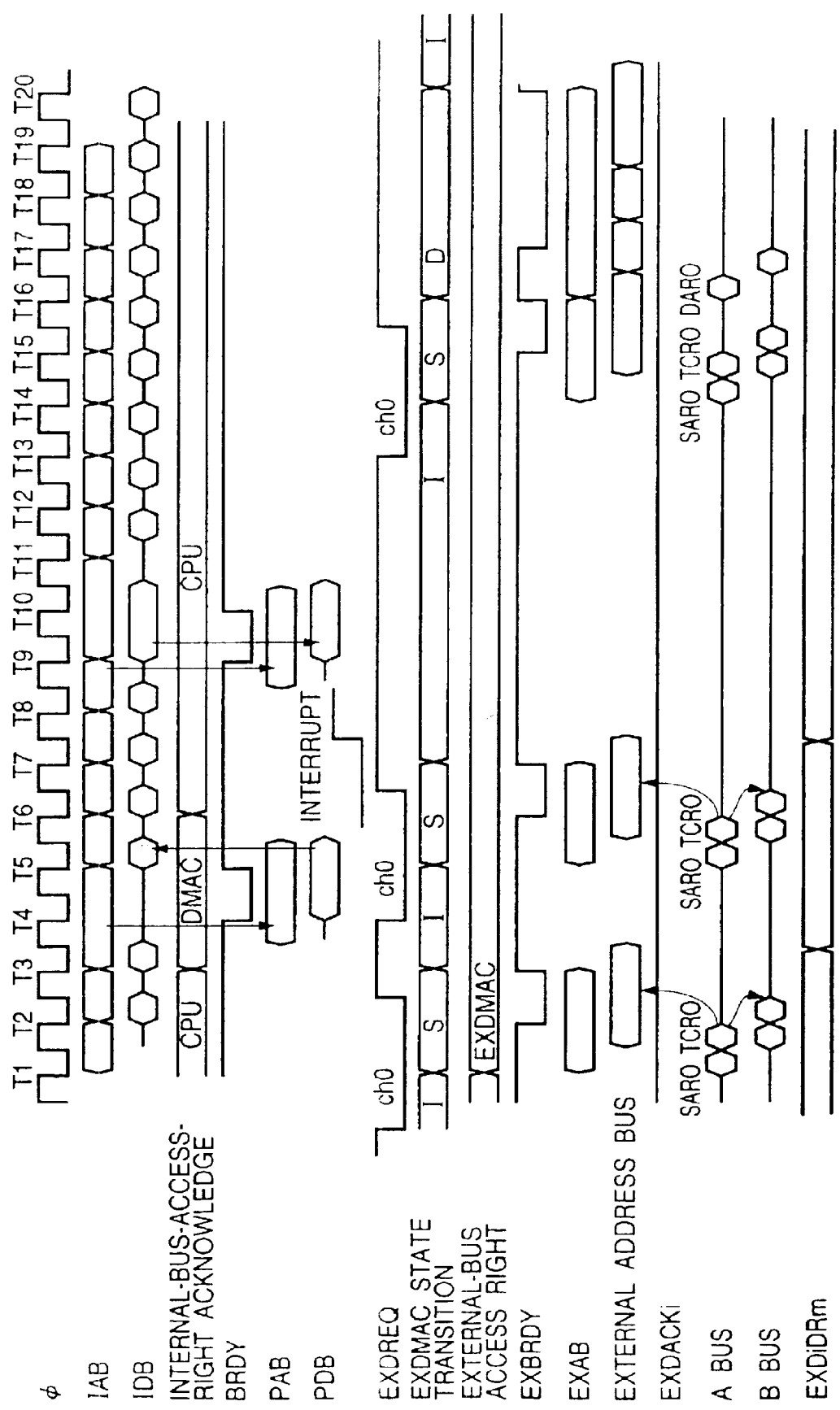
FIG. 10 is a typical operation timing diagram of the buses of the microcomputer system shown in FIG. 9.

FIG. 10 is a typical operation timing diagram of the buses of the microcomputer system. In the operation timing diagram, data is received through a change in setting made by the CPU 2. To be more specific, 10-byte information transferred 5 times such as a packet command is received with 2 bytes received at one time.

A TCR0, that is, a transfer-count register TCR 48 of data-transfer channel 0, is set at H'000005. For an each EXDREQ0 request, 1-word transfer-control data such as a packet command is read out from a predetermined address of a Centronics interface and stored in data registers EXD0DRm. This transfer of data is repeated 5 times. In the first transfer of data, the data is stored in the data registers EXD0DR9 and EXD0DR8 and, in the second transfer of data, the data is stored in the data registers EXD0DR7 and EXD0DR6. In the third transfer of data, the data is stored in the data registers EXD0DR5 and EXD0DR4 and, in the fourth transfer of data, the data is stored in the data registers EXD0DR3 and EXD0DR2. Finally, in the fifth transfer of data, the data is stored in the data registers EXD0DR1 and EXD0DR0. At the end of the fifth transfer of data, the contents of the transfer-count register TCR0 become 0 and the EDE bit is set at "1". At a clock cycle T7, a request for an interrupt is made to the CPU 2.

Receiving the request for an interrupt, the CPU 2 analyzes the transfer control information stored in the data registers EXD0DR9 to EXD0DR0 and sets necessary data transfer conditions. For example, the CPU 2 sets the transfer-count register TCR 48 and clears the MD2 bit to "0". The contents of a SAR0, that is, the SAR 40 of data-transfer channel 0, are the predetermined address of the Centronics interface and it is thus unnecessary to change the contents. On the other hand, the contents of a DAR0, that is, the DAR 41 of data-transfer channel 0, are a next address of the preceding data transfer. In the case of an operation to store pieces of data at consecutive addresses, it is not necessary to change the contents of the DAR0. After the transfer control condition has been set again as described above, control to transfer data information following the packet command is executed.

To put it in more detail, the timing diagram representatively shows a 2-time reception of transferred information, a 1-time operation carried out by the CPU 2 to write data into the CDMAC 4 to re-set transfer control information and a 1-time reception of data information.

On the internal buses IAB and IDB, the CPU 2 reads out data from the ROM 5 and writes or reads out data into and from the RAM 6 mostly in 1 state. In this state, the CPU 2 writes data during a period of time starting from a clock cycle T8 under control executed by the EXDMAC 4 using the internal P buses PAB and PDB. This write operation is an operation to reset a transfer control condition based on an interrupt.

The DMAC 3 transfers data from an internal I/O register such as an SCI-reception data register to the RAM 6 during a period of time starting from a clock cycle T3.

On the other hand, data-transfer channel 0 of the EXDMAC 4 is activated at clock cycles T0 and T4 by the transfer-request signal EXDREQ0 to hold transfer control information from the Centronics interface in buffer registers EXD0DRm. The data-transfer channel is again activated at a clock cycle T13 to transfer data information from the Centronics interface to the buffer RAM 101.

That is, the EXDMAC 4 transits to the S state at a clock cycle T2 in response to the activation by the transfer-request signal EXDREQ0 at the clock cycle T0. In addition, the EXDMAC 4 issues a request for a right to make an access to the external buses EABUS and EDBUS and the external-bus command BCMD as well as outputs an address to the external-address internal bus EXAB. The external-bus command BCMD requests, among other processing, an operation to read out data and an operation to write the data into a register EXD0DRm. The external-bus controller 121 arbitrates requests for a right to make an access to the external buses EABUS and EDBUS before granting such a right to the EXDMAC 4 immediately and activating the external buses EDBUS and EABUS. The external-bus ready signal EXBRDY is temporarily deactivated to put the EXDMAC 4 in a wait state.

When the external-bus ready signal EXBRDY is put back in an active state, the EXDMAC 4 transits to the I state, returning to a wait state. Since the MD2 bit is set at "1", only 1 data access of one bus cycle is made even if the MD1 bit is cleared to "0"to specify the dual-address mode. This is because, at a clock cycle T3, data obtained on the external data bus EDBUS is written into the data registers EXD0DRM of the IOPD 24 and the IOPE 25 as controlled by the external-bus controller 121. The data registers EXD0DRm into which the data is written are selected in accordance with low-order bits of the TCR 48 as described earlier. In actually, in the first transfer of data, the data is stored in the data registers EXD0DR9 and EXD0DR8 and, in the second transfer of data, the data is stored in the data registers EXD0DR7 and EXD0DR6 as described above. By the same token, in the third transfer of data, the data is stored in the data registers EXD0DR5 and EXD0DR4 and, in the fourth transfer of data, the data is stored in the data registers EXD0DR3 and EXD0DR2. Finally, in the fifth transfer of data, the data is stored in the data registers EXD0DR1 and EXD0DR0. In the bus timing diagram of FIG. 10, data is stored in the data registers EXD0DR3 and EXD0DR2 at the bus cycle T3 while and data is stored in the data registers EXD0DR1 and EXD0DR0 at a bus cycle T7.

At a bus cycle T6, the contents of the TCR 48 are decremented. As the contents of the TCR 48 become 0, the EDE bit is set to a "1". At a clock cycle T7, a request for an interrupt is made to the CPU 2. In response to this request, the CPU 2 carries out interrupt processing. In an interrupt processing routine, the CPU 2 fetches the contents of EXD0RDm and changes the setting of the transfer control condition of the EXDMAC 4. An operation to write data into the EXDMAC 4 is carried out only once as a representative in the timing diagram. The registers EXD0DRm and the EXDMAC 4 use the internal P buses PAB and PDB so that read and write operations can be carried out without using the external buses EABUS and EDBUS. As a result, a transfer of data controlled by the EXDMAC 4 through another channel is not obstructed.

After modification of the setting for data-transfer channel 0 of the EXDMAC 4, at a clock cycle T13, the EXDMAC 4 transits to the S state in response to the activation of the transfer-request signal EXDREQ0. In addition, the EXDMAC 4 issues a request for a right to make an access to the external buses EABUS and EDBUS and the external-bus command BCMD as well as outputs an address to the external-address internal bus EXAB. The external-bus command BCMD requests, among other processing, a read operation, prohibition of a bus-right transfer after the read operation and latching of data read out in the read operation. The external-bus controller 121 arbitrates requests for a right to make an access to the external buses EABUS and EDBUS before granting such a right to the EXDMAC 4 immediately and activating the external buses EDBUS and EABUS. The external-bus ready signal EXBRDY is temporarily deactivated to put the EXDMAC 4 in a wait state.

When the external-bus ready signal EXBRDY is put back in an active state, the EXDMAC 4 transits to the D state. In this state, the EXDMAC 4 issues a request for a right to make an access to the external buses EABUS and EDBUS and the external-bus command BCMD as well as outputs an address to the external-address internal bus EXAB. The external-bus command BCMD requests, among other processing, a write operation and outputting latched data.

The external-bus controller 121 arbitrates requests for a right to make an access to the external buses EABUS and EDBUS before granting such a right to the EXDMAC 4 immediately and activating the external buses EDBUS and EABUS. The external-bus ready signal EXBRDY is temporarily deactivated to put the EXDMAC 4 in a wait state. When the external-bus ready signal EXBRDY is put in an active state (at a high level), the EXDMAC 4 transits to the I state, returning to a wait state. Since the MD2 bit is cleared to "0", 2 data accesses are made due to the fact that the MD1 bit is cleared to "0" to specify the dual-address mode. The first data access is made to read out data from the Centronics interface as is the case with the operation to read out transfer control information. The second access is made to write the transfer control information into the buffer RAM 101.

The external-bus controller 121 forms a judgment on an access to an area in the buffer RAM 101, supplying an external-bus control signal to the IOPA to the IOPF so as to make the access in 4 states including precharge, RAS and CAS cycles. A RAS address is compared with that of the immediately preceding access to the RAM 101. If the present access is made to the same page as the immediately preceding access, a high-speed-page mode involving a CAS cycle only is adopted.

Figure 11:
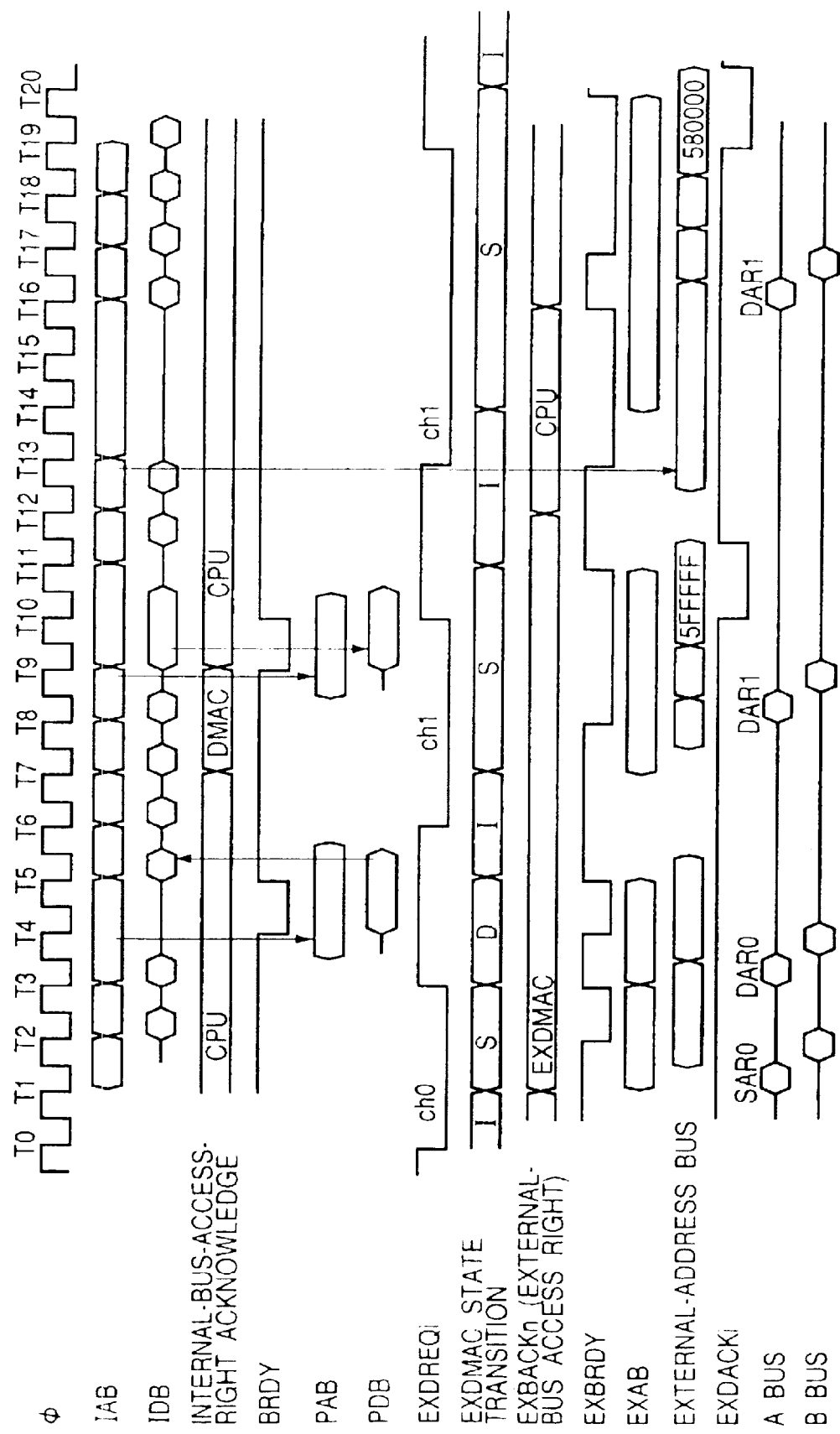
FIG. 11 is another typical timing diagram of bus operations in the computer system shown in FIG. 9.

FIG. 11 is another typical timing diagram of bus operations in the microcomputer system shown in FIG. 9. The following description focuses on a case in which the latch circuit 72L is used.

Similarly to what is described earlier, the internal buses IAB and IDB are mainly used to fetch instructions of a program stored in the ROM 5 and to read out and write data from and into the RAM 6. In particular, the CPU 2 reads out data from an I/O register such as an A/D converter using the internal P buses PAB and PDB during a period of time starting from a clock cycle T3 and reads out data from an external memory such as a CGROM during a period of time starting from a clock cycle T12. Since circuits connected to the internal P buses PAB and PDB have an access speed lower than the RAM 6 and the ROM 5, the bus ready signal BRDY is generated by the bus controller 120.

The DMAC 3 transfers data from an internal memory such as the RAM 6 to an internal I/O register such as the pulse output circuit 8 during a period of time starting from a clock cycle T7.

In the EXDMAC 4, on the other hand, data-transfer channel 0 is used for transferring data in the dual-address mode while data-transfer channel 1 is used for transferring data in the single-address mode. At a clock cycle T0, data-transfer channel 0 is activated while, at clock cycles T7 and T14, data-transfer channel 1 is activated. It should be noted that the activation request signal EXDREQi where i=0 to 3 is also shown in the bus timing diagram of FIG. 11. Portions of the activation request signal EXDREQi marked with ch0 and ch1 represent the states of the signals EXDREQ0 and EXDREQ1 respectively.

At the clock cycle T0, the EXDMAC 4 transits to the S state in response to the activation by the transfer-request signal EXDREQ0. In addition, the EXDMAC 4 issues a request for a right to make an access to the external buses EABUS and EDBUS and the external-bus command BCMD as well as outputs an address to the external-address internal bus EXAB. The external-bus command BCMD requests, among other processing, a read operation, prohibition of a bus-right transfer after the read operation and latching of data read out in the read operation. The external-bus controller 121 arbitrates requests for a right to make an access to the external buses EABUS and EDBUS before granting such a right to the EXDMAC 4 immediately by generating a signal EXBACK 2 and activating the external buses EDBUS and EABUS. The external-bus controller 121 deactivates the external-bus ready signal EXBRDY temporarily at a low level to insert a wait state into the EXDMAC 4.

When the external-bus ready signal EXBRDY output by the external-bus controller 121 is put back in an active state, the EXDMAC 4 ends the memory cycle, transiting to the D state. Then, the EXDMAC 4 issues a request for a right to make an access to the external buses EABUS and EDBUS and the external-bus command BCMD as well as outputs an address to the external-address internal bus EXAB. The external-bus command BCMD requests, among other processing, a write operation and outputting latched data. The external-bus controller 121 arbitrates requests for a right to make an access to the external buses EABUS and EDBUS before granting such a right to the EXDMAC 4 immediately by generating a signal EXBACK 2 and activating the external buses EDBUS and EABUS. Much like the operation described above, the external-bus controller 121 deactivates the external-bus ready signal EXBRDY temporarily at a low level to insert a wait state into the EXDMAC 4. The external-bus controller 121 forms a judgment on an access to an area in the buffer RAM 101, supplying an external-bus control signal to the IOPA to the IOPF so as to make the access in 4 states including precharge, RAS and CAS cycles. When the external-bus ready signal EXBRDY is temporarily deactivated, the external-bus controller 121 inserts a wait cycle into the EXDMAC 4.

As the external-bus ready signal EXBRDY is activated, the EXDMAC 4 completes the memory cycle and transits to the I state, returning to a wait state.

At a clock cycle T7, the transfer-request signal EXDREQ1 is activated, causing the EXDMAC 4 to transit to the S state. In the S state, the EXDMAC 4 generates an external-bus command BCMD and a request for a right to make an access to the external buses EABUS and EDBUS. In addition, the EXDMAC 4 outputs an address to the external-address internal bus EXAB. The external-bus command BCMD requests the external-bus controller 121 to generate signals such as a read signal and the signal EXDACK1. The external-bus controller 121 arbitrates requests for a right to make an access to the external buses EABUS and EDBUS and immediately grants an access to the external buses EABUS and EDBUS to the EXDMAC 4 by outputting the signal EXBACK 2 to the EXDMAC 4, activating the external buses EABUS and EDBUS. Much like what has been described above, the external-bus ready signal EXBRDY is temporarily deactivated and the external-bus controller 121 inserts a wait cycle into the EXDMAC 4. The external-bus controller 121 determines that the requested access is an access to an area in the DRAM. In this case, the access is implemented in 4 states including precharge, CAS and RAS cycles. As the external-bus ready signal EXBRDY is activated, the EXDMAC 4 completes the memory cycle and transits to the I state, returning to a wait state.

Then, at the clock cycle T14, the EXDMAC 4 transits to the S state in response to the activation by the transfer-request signal EXDREQ1. In addition, the EXDMAC 4 issues a request for a right to make an access to the external buses EABUS and EDBUS and the external-bus command BCMD as well as outputs an address to the external-address internal bus EXAB. The external-bus command BCMD requests, among other processing, a read operation and generation of an acknowledge signal EXDACK1. The external-bus controller 121 arbitrates requests for a right to make an access to the external buses EABUS and EDBUS. Since the CPU 2 is executing an operation to read out data by using the external buses EABUS and EDBUS, however, the external-bus controller 121 puts the EXDMAC 4 in a state of waiting for the CPU 2 to complete the read operation instead of granting a right to make an access to the external buses EABUS and EDBUS to the EXDMAC 4. At a clock cycle T17, the external-bus controller 121 grants a right to make an access to the external buses EABUS and EDBUS to the EXDMAC 4, activating the external buses EABUS and EDBUS. The external-bus controller 121 deactivates the external-bus ready signal EXBRDY temporarily at a low level to insert a wait state into the EXDMAC 4. When the external-bus ready signal EXBRDY output by the external-bus controller 121 is put back in an active state, the EXDMAC 4 transits to the I state, returning to a wait state.

In the DTMR1 (the DTMR 42 of data-transfer channel 1), the DTIE bit is cleared to "0", the RPB2 to RPB0 bits are set at B'011 and the SM1 and SM0 bits are set at B'10 to set a repetitive operation to transfer data in 512-kB units. At a clock cycle T9, the contents of the DAR1, that is, the DAR 40 of data-transfer channel 1, are incremented, being updated from H'5FFFFF to H'580000 to continue the operation. That is, an area from the address H'580000 to the address H'5FFFFF in the buffer RAM 101 forms a ring buffer. The CPU 2 reads out data from the DAR1 (or the DAR 40 of data-transfer channel 1) to obtain an input pointer to the ring buffer. By referencing the input pointer, an operation to read out data from the ring buffer can be carried out with ease so as to make the amount of data left in the ring buffer appropriate.

In addition, since EXDMAC 4 continues the operation without a stop, an activation request signal generated at a restart is always detected and never detected incorrectly.

When the CPU 2 makes a request for a read or write operation using the external buses EABUS and EDBUS and the EXDMAC 4 makes a request for a transfer of data using the external buses at the same time, either the CPU 2 or the EXDMAC 4 enters a halt state temporarily. Since the CPU 2 makes data accesses neither frequently nor continuously and the EXDMAC 4 does not transfer data continuously either, it is possible to prevent both the CPU 2 and the EXDMAC 4 from entering a halt state for a long period of time. At least, the CPU 2 is capable of executing a program stored in the ROM 5 concurrently with a transfer of data through the external buses EABUS and EDBUS controlled by the EXDMAC 4. In other words, data can be transferred by the EXDMAC 4 using the external buses EABUS and EDBUS without degrading the processing performance of the CPU 2. In addition, data can be transferred by the EXDMAC 4 using the external buses EABUS and EDBUS concurrently with a transfer of data controlled by the DMAC 3 by using the internal buses IAB and IDB.

It should be noted that, by synchronizing a request for a right to make an access to the internal buses IAB and IDB and an acknowledge signal for the request with a clock or bus-ready signal, a bus-access right can be transferred from the CPU 2 to the DMAC 3 and vice versa without incurring an overhead. By the same token, a right to make an access to the external buses EABUS and EDBUS can be transferred from the CPU 2 to the EXDMAC 4 and vice versa without incurring an overhead.

Figure 12:
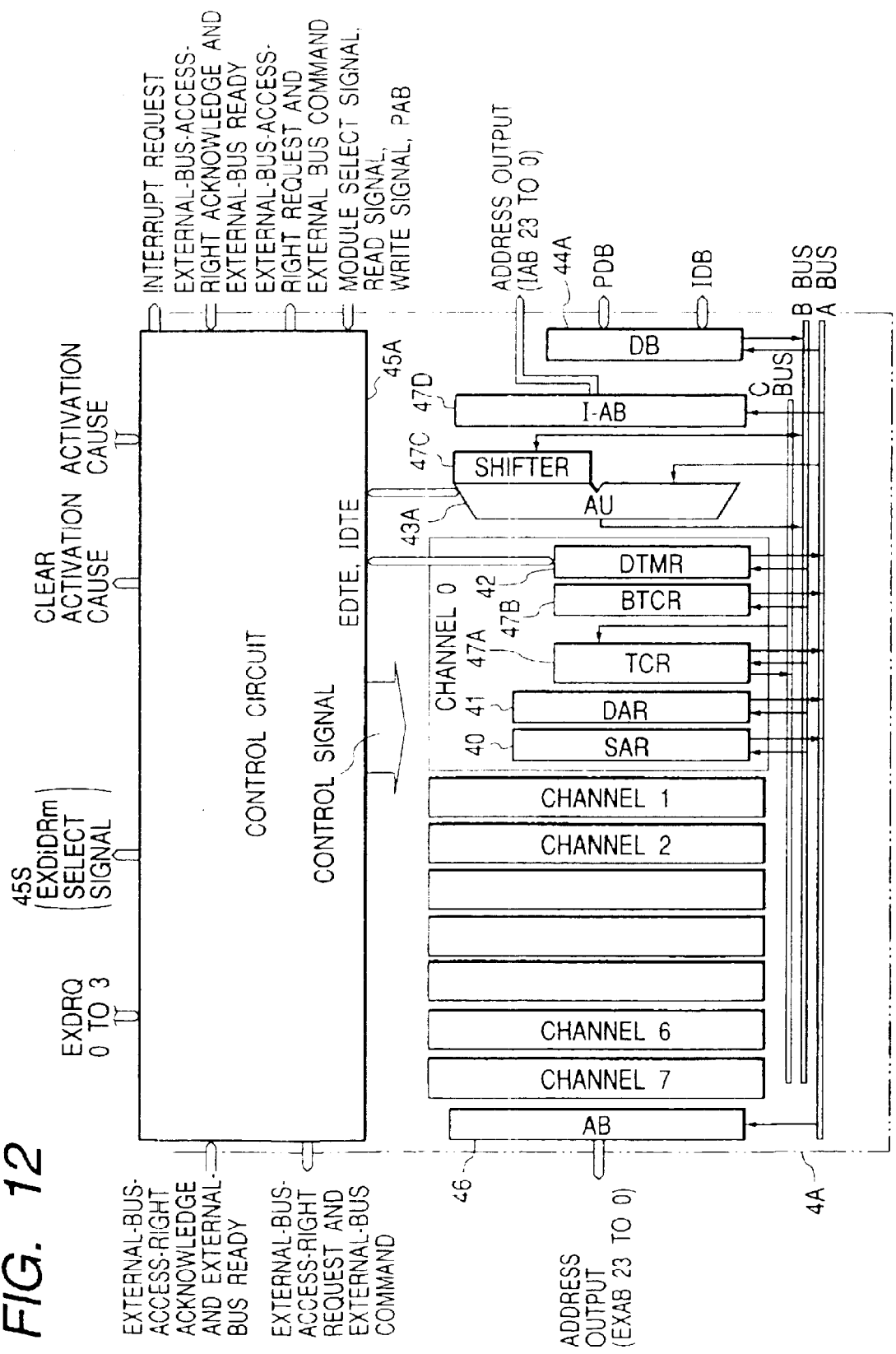
FIG. 12 is a block diagram showing another typical external-bus controller DMAC.

FIG. 12 is a block diagram showing an external-bus controller DMAC 4A which has the functions of both the general-purpose DMAC 3 and the EXDMAC 4 described above.

The external-bus controller DMAC 4A is provided with data-transfer channels 0 to 7 each having the DTMR 42, the SAR 40, the DAR 41, a transfer counter TCR 48 and another transfer counter BTCR 47B which each function as a control register. An arithmetic-processing unit 43A has a shifter 47C. The external-bus controller DMAC 4A includes 3 internal busses, namely, A, B and C buses.

Much like the EXDMAC 4 shown in FIG. 6, the external-bus controller DMAC 4A shown in FIG. 12 is provided with an interface with the external-bus controller 121, an interface with the internal-bus controller 120 including a signal requesting a right to make an access to internal buses, an internal-bus command, an IAB output, a signal acknowledging a request for a right to make an access to the internal buses, an internal-bus-ready input signal and IDB inputs/outputs in addition to the interface with the internal-bus masters including the CPU 2 and the interface with the internal-bus controller 120.

When the EDTE bit of the DTMR 42 is set at "1", a request for a right to make an access to the external buses EABUS and EDBUS and an external-bus command BCMD can be issued to the external-bus controller 121 and data can be transferred through the external buses EABUS and EDBUS concurrently with execution of a program by the CPU 2 using the internal buses.

When the IDTE bit of the DTMR 42 is set at "1", on the other hand, a transfer of data between any arbitrary addresses through the internal buses (the I buses) such as a request for a right to make an access to the internal buses and an internal-bus command can be issued to the internal-bus controller 120 in an exclusive manner from the operation of the CPU 2 using the internal buses. It should be noted that the EDTE and IDTE bits of the DTMR 42 are not shown in FIG. 12.

In the configuration shown in FIG. 12, a limited number of data-transfer channels among the 8 channels can be allocated to transfers of data by being swapped with each other. For example, 2 data-transfer channels can be allocated to data transfers of the external-bus controller DMAC 4A using the external data buses EABUS and EDBUS while the remaining 6 channels are allocated to transfers of data using the internal buses. In addition, logic such as the arithmetic-processing unit 43A and bus interfaces can be shared among components. When a plurality of requests for activation are received at the same time, a request for a transfer of data through the external buses EABUS and EDBUS is given the highest priority in order to take advantage of the capability of carrying out an operation concurrently with the processing carried out by the CPU 2.

In addition, if a control circuit for controlling a transfer of data through the external buses EABUS and EDBUS is provided separately from a control circuit for controlling a transfer of data through the internal buses and their arithmetic-processing units and buses are also provided separately, data can be transferred through the internal buses concurrently with a transfer of data through the external buses EABUS and EDBUS.

The external-bus controller DMAC 4A can also be configured so that, when the single-address mode is selected, data can be transferred only through the external buses EABUS and. EDBUS and, when the dual-address mode is selected, on the other hand, data can be transferred only through the internal buses. If the number of selectable activation drivers is limited in this way, the number of control bits can be reduced more than the degree of freedom to use the external-bus controller DMAC 4A is lowered.

Figure 13:
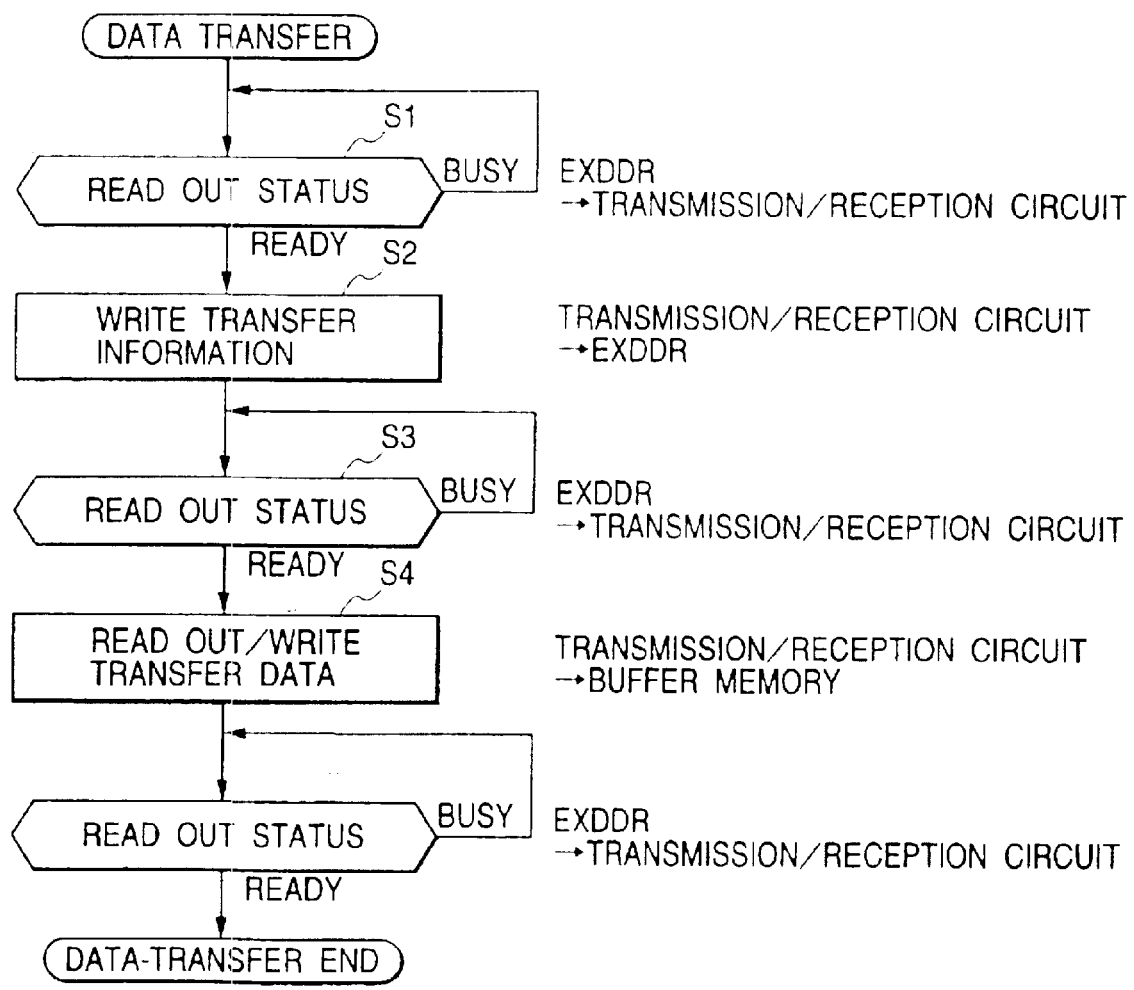
FIG. 13 is a flowchart representing a transmission of data between the printer control system shown in FIG. 9 and a host apparatus connected to a host interface of the printer control system.

FIG. 13 is a flowchart representing a transmission of data between the printer control system shown in FIG. 9 and a host apparatus connected to a host interface of the printer system but not shown in FIG. 9.

The host apparatus prepares data to be printed such as a text or a picture as required data, starting a transmission of the data.

As shown in FIG. 13, the flowchart begins with a step S1 at which the host apparatus checks the status of the printer system. As described above, the microcomputer 1 employed in the printer system outputs status information stored in the registers EXDiDRm by using the EXDMAC 4 to the communication circuits 100 which then transmit the status information to the host apparatus.

If the status information is found by the host apparatus to be busy status, the flow of the transmission goes back to the step S1. If the status information is found by the host apparatus to be ready status, on the other hand, the flow of the transmission goes on to a step S2 at which the host apparatus transmits transfer control information to the printer system. The transfer control information includes the type of data to be printed and the amount of the data. The transfer control information is stored in the registers EXDiDRm by the EXDMAC 4. The CPU 2 analyses the transfer control information, carrying out processing such as re-setting of the EXDMAC 4 according to a result of the analysis.

At a step S3, the host apparatus checks the status of the printer system. If the status information is found by the host apparatus to be busy status, the flow of the transmission goes back to the step S3. If the status information is found by the host apparatus to be ready status, on the other hand, the flow of the transmission goes on to a step S4 at which the host apparatus transmits the data to be printed. The EXDMAC 4 then stores the data to be printed in the buffer RAM 101. Then, the CPU 2 carries out a necessary printing process on the data to be printed.

At a step S5, the host apparatus checks the status of the printer system. If the status information is found by the host apparatus to be busy status, the flow of the transmission goes back to the step S5. On the other hand, ready status indicates that the printing of the data has been completed.

Figure 14:
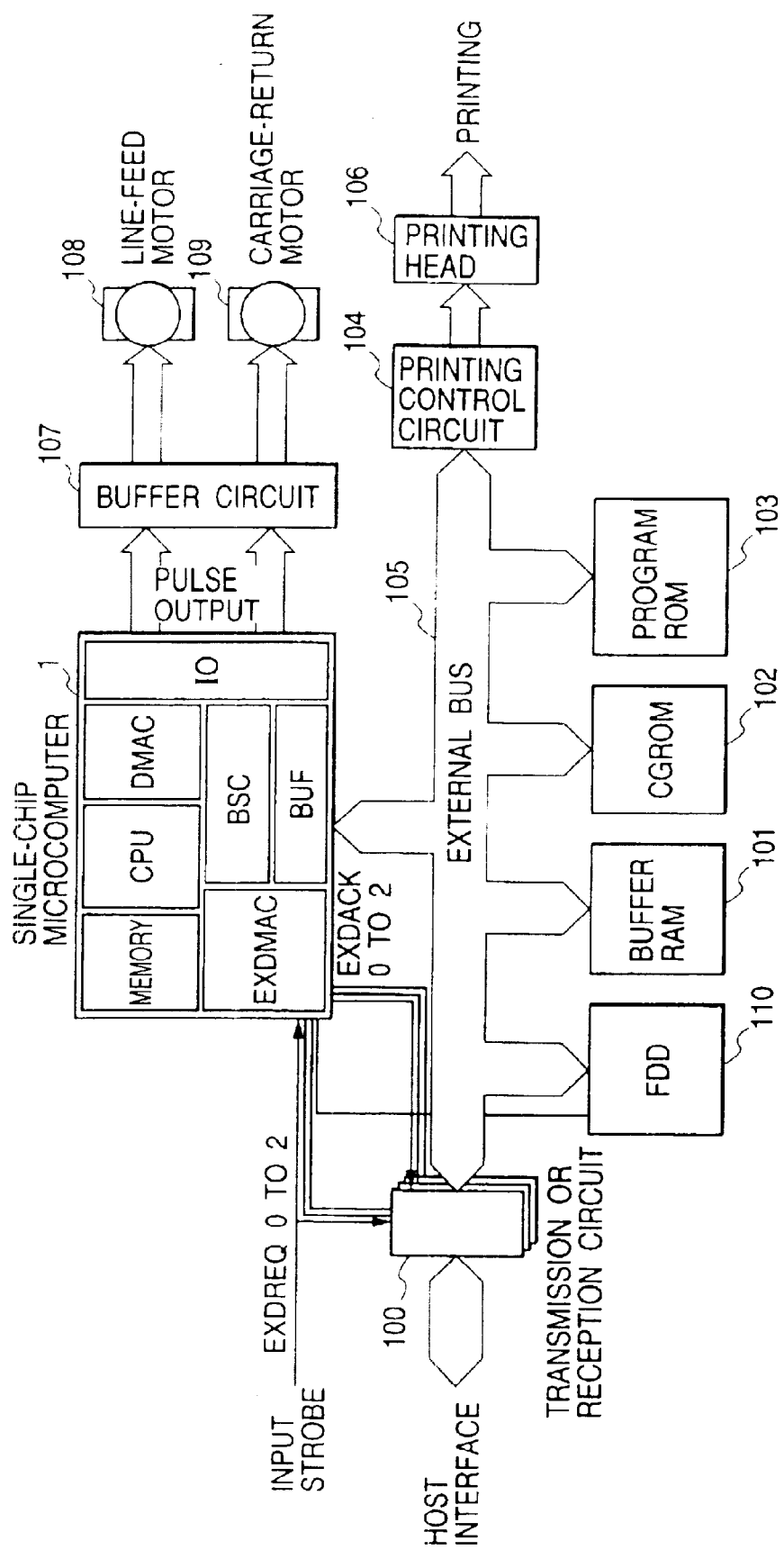
FIG. 14 is a block diagram showing a modified configuration of the typical microcomputer system including the described microcomputer shown in FIG. 1 as used in control of a printer.

FIG. 14 is a block diagram showing a modified configuration of the typical microcomputer system including the described microcomputer 1 used in control of a printer.

This modified configuration includes a flexible-disc drive 110. For example, picture data obtained typically by using a digital still camera can be entered directly to the flexible-disc drive 110 to be printed without entering the data through the host apparatus.

In this case, the microcomputer 1 is capable of issuing a command to read out the data from the flexible-disc drive 110. Typically, the CPU 2 prepares the read command in registers EXDiDRm in advance to be transferred by the EXDMAC 4 to the flexible-disc drive 110. As an alternative, the CPU 2 transfers the command to the flexible-disc drive 110 directly. In either case, the CPU 2 needs to set the EXDMAC 4 so as to transfer the picture data from the flexible-disc drive 110 to the RAM 101 in accordance with the read command.

When the flexible-disc drive 110 completes preparation to transfer the picture data in accordance with the read command, a request for a transfer of the data by using the EXDMAC 4 is made. In response to the request, the EXDMAC 4 transfers the picture data from the flexible-disc drive 110 to the RAM 101.

In place of the flexible-disc drive 110, an EEPROM device implemented typically by a flash memory can be used in conjunction with an interface. The substitute for the flexible-disc drive 110 is not limited to a specific storage medium.

Figure 15:
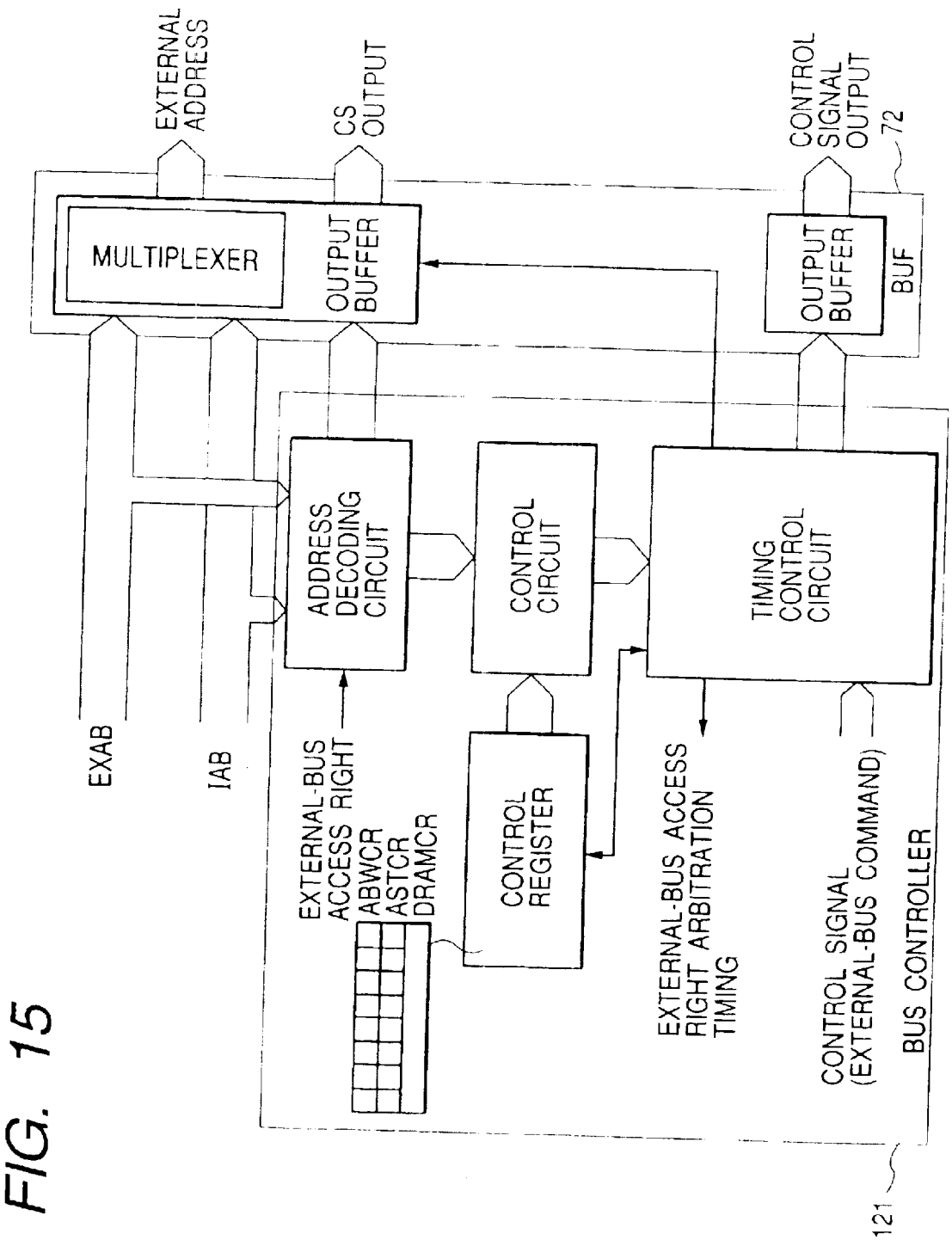
FIG. 15 is a block diagram showing main components employed in the external-bus controller DMAC and a buffer employed in the microcomputer shown in FIG. 1.

FIG. 15 is a block diagram showing main components employed in the external-bus controller 121 and the buffer 72.

As shown in the figure, the internal address bus IAB and the external-address internal bus EXAB are connected to an address decoder 1211 employed in the external-bus controller 121 which determines to give an external-bus matter a right to make an access to the external buses EABUS and EDBUS in accordance with an external-bus command BCMD received from the master. If the external-bus master is the internal-bus controller 120 representing the CPU 2 or the DMAC 3, an address asserted on the internal address bus IAB is decoded by the address decoder 1211. If the external-bus master is the EXDMAC 4, on the other hand, an address asserted on the external-address internal address bus EXAB is decoded by the address decoder 1211. A result of decoding is supplied as an area select signal 1215 to a control circuit 1212.

The control circuit 1212 refers to control registers 1213 for data corresponding to a selected area. Examples of the control registers are an ABWCR, an ASTCR and a DRAMCR. The ABWCR and the ASTCR are each an 8-bit register corresponding to an area and used for selecting an address-bus width of 8 bits or 16 bits and selecting a 2-state access or a 3-state access. The DRAMCR is used for specifying, among other things, setting information of the DRAM interface and a shift amount of address multiplexing.

The control circuit 1212 determines the bus cycle to be executed and activates a timing control circuit 1214 in accordance with the information described above.

The timing control circuit 1214 generates a control signal 1216 and controls an address multiplexer 722A employed in the buffer 72 in accordance with a bus cycle specified by the control circuit 1212 and the external-bus command BCMD. In addition, at the end of the external-bus cycle, the timing control circuit 1214 outputs an external-bus-access-right arbitration timing signal 1217 making a request for arbitration of requests for a right to make an access to the external buses EABUS and EDBUS.

Figure 16:
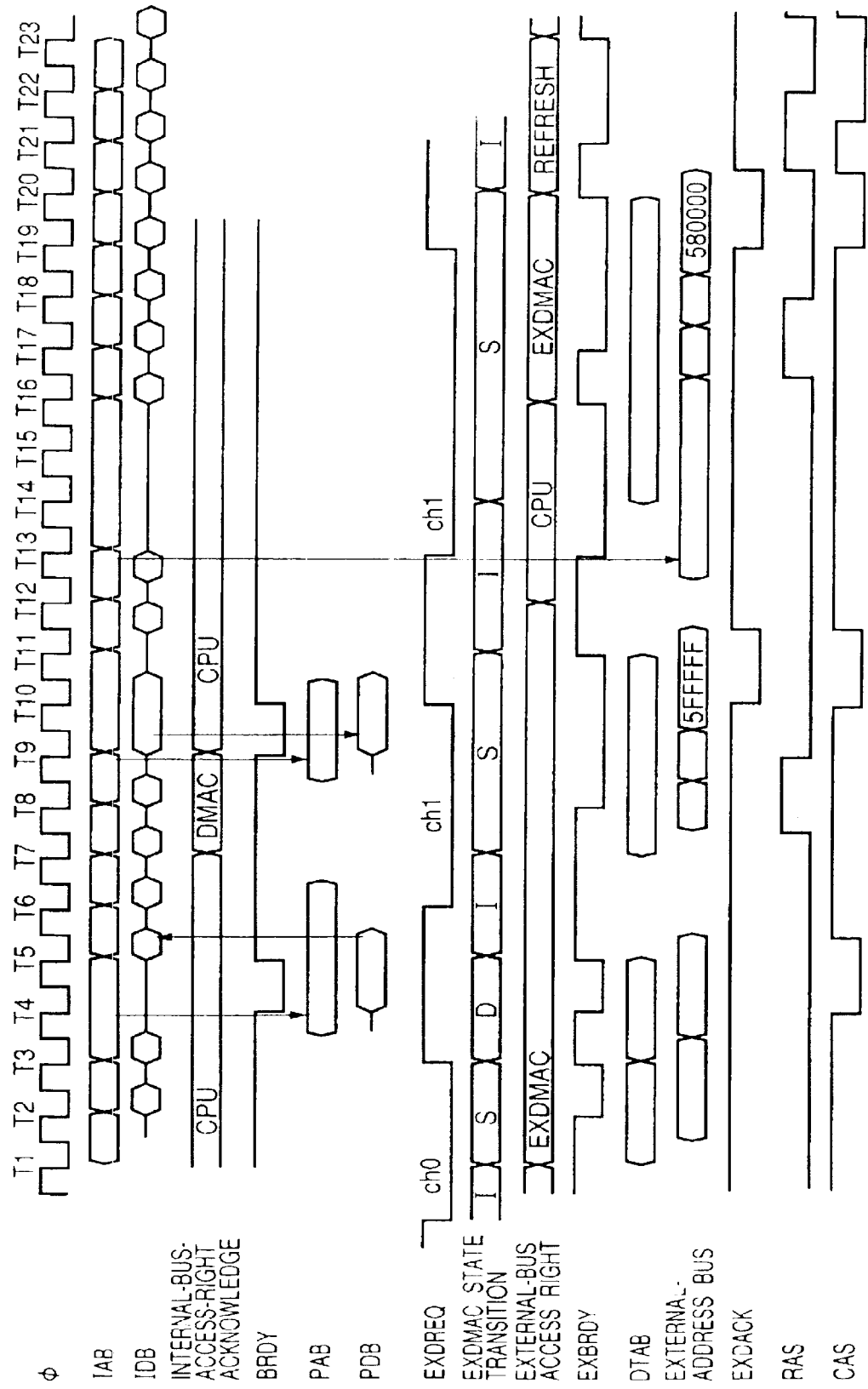
FIG. 16 is a timing diagram showing also DRAM control signals appearing during a bus operation carried out by the microcomputer system.

FIG. 16 is a timing diagram showing also DRAM control signals appearing during a bus operation carried out by the microcomputer system described above.

RAS and CAS signals are used for controlling addresses in the DRAM. Special DRAMs such as a fast-page DRAM, an EDO DRAM and a synchronous DRAM have a high-speed page mode which allows a data access to be made at a high speed. In the high-speed page mode, the RAS and CAS signals are both put in a selected state in order to make an access to the DRAM. In the end of the access to the DRAM, the RAS signal is sustained in the selected state as it is. Prior to a next access to the DRAM, the address of data to be accessed is examined to determine whether or not the data is located on the same page as the immediately preceding access. If the data is located on the same page as the immediately preceding access, only the CAS signal is again put in a selected state to allow the DRAM to be re-accessed. For example, a write cycle of data-transfer channel 0 of the EXDMAC 4 starting from a clock cycle T4 is completed in 2 states by re-selecting the CAS signal only.

In an access to the DRAM in a single-address cycle through data-transfer channel 1 in a period of time starting from a clock cycle T8 or T17, on the other hand, first of all, the RAS signal is put in a de-selected state. Then, after a pre-charge cycle of 1 state is completed, the RAS signal is put back in a selected state during a RAS-signal cycle of 1 state. Finally, the access to the DRAM is completed at the end of a CAS-signal cycle of 2 states.

In this timing diagram, a refresh cycle of the DRAM is carried out in a period of time starting from a clock cycle T21. Refresh cycles are executed at predetermined time intervals. For each time intervals, a refresh timer of the semiconductor integrated circuit issues a request for a right to make an access to the external buses EABUS and EDBUS. After such a right is secured, a refresh cycle is carried out. In this timing diagram, the refresh cycle is a CAS-before-RAS refresh which can be executed concurrently with an access to the internal buses made by the CPU 2.

Figure 17:
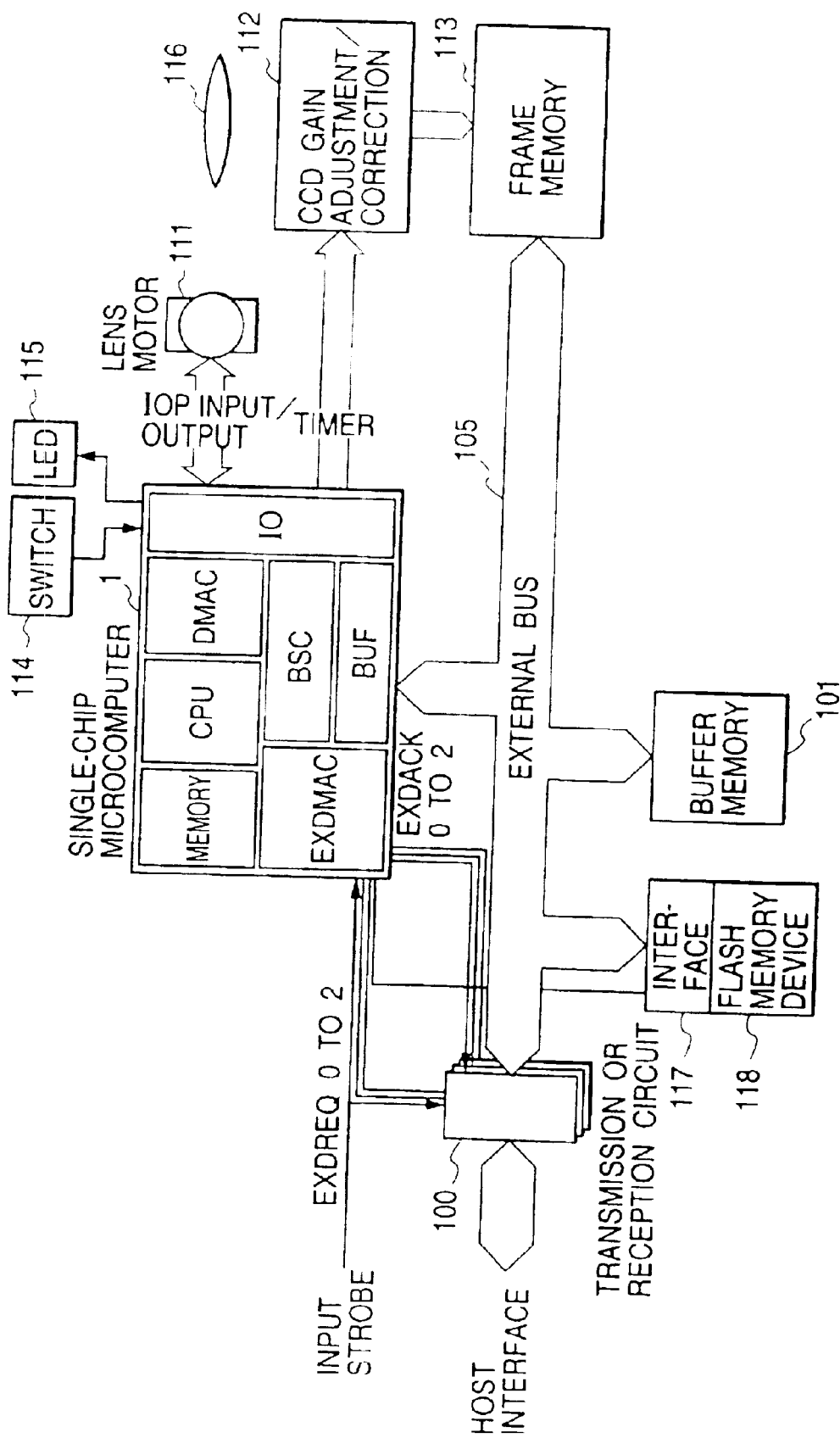
FIG. 17 is a block diagram showing another typical microcomputer system including the microcomputer shown in FIG. 1 for controlling a digital still camera.

FIG. 17 is a block diagram showing another typical microcomputer system including a single-chip microcomputer provided by the present invention for controlling a digital still camera.

In place of the line-feed motor 108, the carriage-return motor 109 and the printing head 106 employed in the application to a printer shown in FIG. 9, the microcomputer system shown in FIG. 17 includes a lens motor 111, a CCD/gain adjustment/correction circuit 112, a switch 114 typically functioning as a shutter button, LEDs 115 for displaying various kinds of status such as a power-on state and a frame memory 113. A program for controlling the digital still camera can be stored in the ROM 5 embedded in the microcomputer 1 or a program ROM connected to the external buses EABUS and EDBUS but not shown in the figure.

The microcomputer 1 controls the lens motor 111 and the CCD/gain adjustment/correction circuit 112 by using mainly input/output signals of a timer and an I/O unit. An optical signal received through a lens 116 is converted by a CCD into an electrical signal. After completing a gain adjustment and a correction, the electrical signal is stored into the frame memory 113. Picture data stored in the frame memory 113 is transferred by the EXDMAC 4 to the buffer memory 101.

Picture data to be saved is stored by the EXDMAC 4 into a flash memory device 118 by way of an interface 117. The picture data may be transmitted to typically a host computer connected to the digital still camera by way of a transmission/reception circuit 100. As an alternative, the picture data stored in the flash memory device 118 by the EXDMAC 4 is transmitted to the host computer by way of a transmission/reception circuit 100.

The operation is about the same as that of the printer control system described earlier except that the direction of the data transfer is opposite. Much like the printer control system, data received from the host computer or the like through the transmission/reception circuit 100 can be stored in the flash memory device 118 by way of the interface 117.

Other microcomputer systems that can be implemented by this embodiment include control systems of a digital video camera and a digital video disc.

Figure 18:
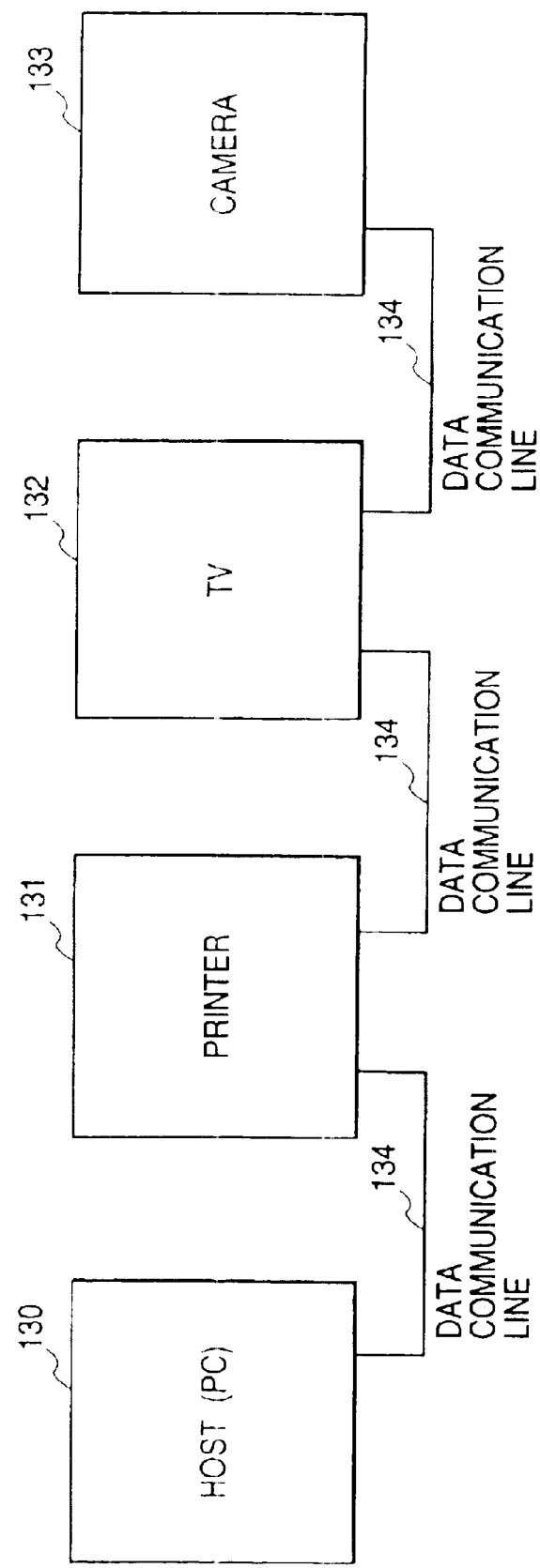
FIG. 18 is a block diagram showing an application in which a plurality of microcomputer systems each employing the microcomputer shown in FIG. 1 are connected to each other.

FIG. 18 is a block diagram showing an application in which a plurality of microcomputer systems are connected to each other.

The microcomputer systems shown in FIG. 18 are a personal computer (PC) 130, the printer control system 131, a television receiver (TV) 132 and a digital still camera 133. Picture data taken by the digital still camera 133 is transmitted to the TV 132 and the printer control system 131 by way of a host interface to be displayed and printed respectively. As an alternative, the picture data can also be transmitted to the PC 130. In the PC 130, the picture data is edited and the edited picture data can then be transmitted to the TV 132 and the printer control system 131. Unlike the printer control systems shown in FIGS. 9 and 14 wherein a host apparatus is fixed from the beginning as described earlier, in this application, it is not necessary to determine a host apparatus in advance. In this application, an apparatus making a request for a transfer of data at the beginning through a data communication line 134 is treated as a host.

In this application, a plurality of microcomputer systems are linked to each other in a daisy connection. It should be noted, however, that they can also be linked to each other in a star connection using a hub.

Figure 19:
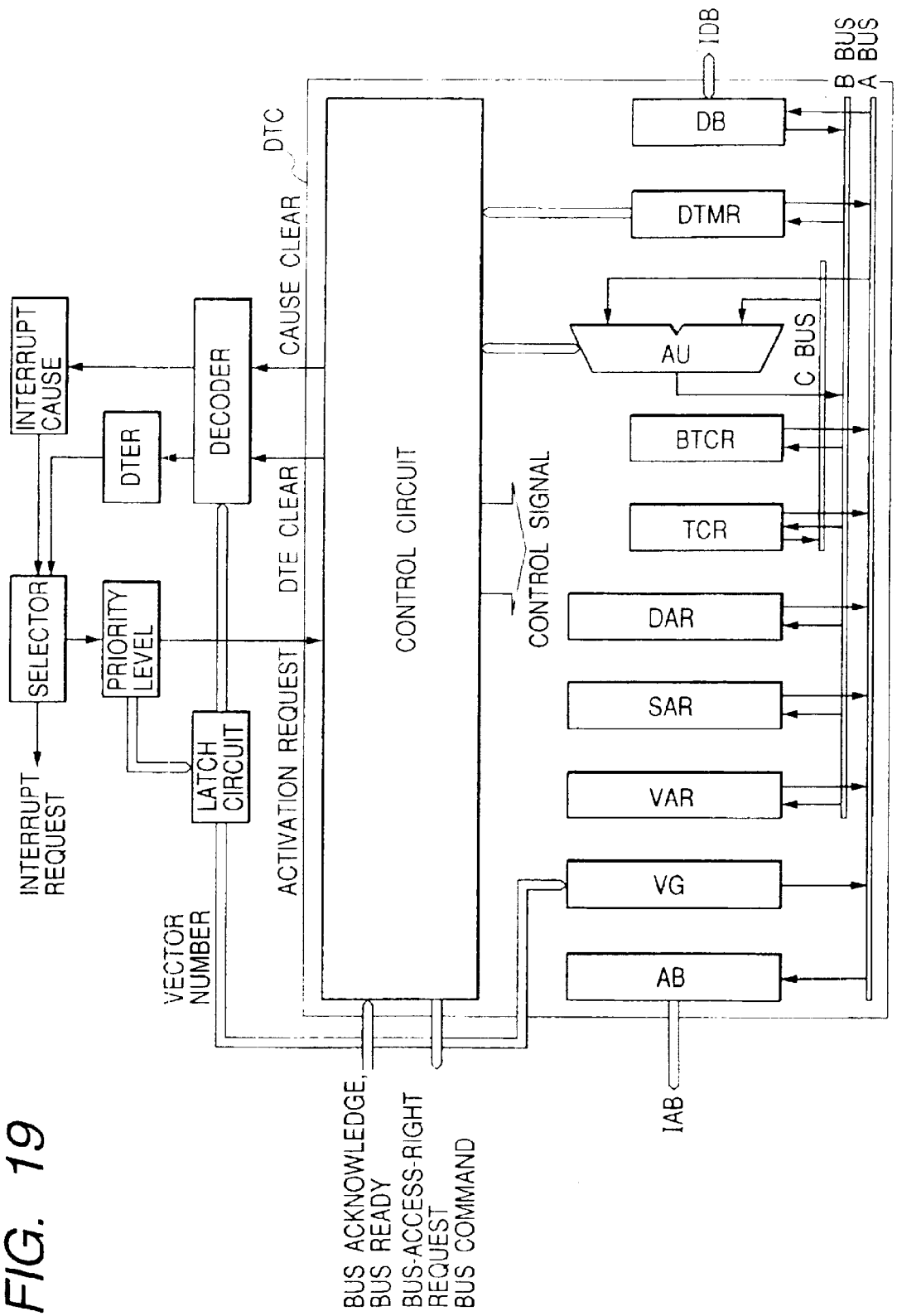
FIG. 19 is a block diagram showing a typical configuration of a DTC (data-transfer controller) which can be used as a substitute for the DMAC connected to the internal buses.

It is possible to employee a data-transfer controller (DTC) as a second data-transfer unit connected to the internal buses of the microcomputer. The DTC is disclosed in Japanese Patent Laid-open No. Hei 7-129537 and U.S. Pat. No. 5,809,259. FIG. 19 is a block diagram showing the DTC.

In the DTC, data-transfer information stored in a RAM in advance is transferred to the DTC from the RAM when the DTC is activated. After a transfer of data is completed, the data-transfer control information is saved back in the RAM. In this way, it is possible to prevent the logical and physical scales of the DTC from increasing or to keep up with a plurality of requests for activation and requests for a data transfer. It is also possible to sufficiently increase the number of bits in the address register.

Moreover, results of a study conducted by the inventor of the invention indicate that, having only functions of a master, the DTC reads out and writes transfer control information by itself from and into the RAM which is shared with the CPU in order to transfer data. The DTC thus has no functions of a slave. If contentions of the CPU and the DTC itself for use of and accesses to the buses can be avoided, the logic configuration can be further simplified and the development time and the like can be reduced. Thus, the margin for a functional expansion is big.

By combination with the external-bus controller DMAC, the logic configuration can be simplified while data can be transferred in a flexible manner and at a high speed.

For the reason described above, the DTC interfaces only with the internal data bus IDB, having registers for 1 data-transfer channel, namely, a source-address register (SAR), a destination-address register (DAR), a transfer-count register (TCR), a block transfer-count register (BTCR) and a transfer mode register (DTMR).

An interrupt can be generated by the DTC for activation of the DTC. It is possible to select a scheme in which a DTC enable register makes a request by generating an interrupt to the CPU or a scheme in which the DTC is requested to carry out a transfer of data. A request for activation is supplied to a priority-level determination circuit which passes on the request and supplies a vector number to the DTC.

When the transfer of predetermined data is completed, the DTC outputs a DTE clear signal or a cause clear signal to clear respectively a DTE bit or an interrupt cause flag corresponding to the activation cause.

Figure 20:
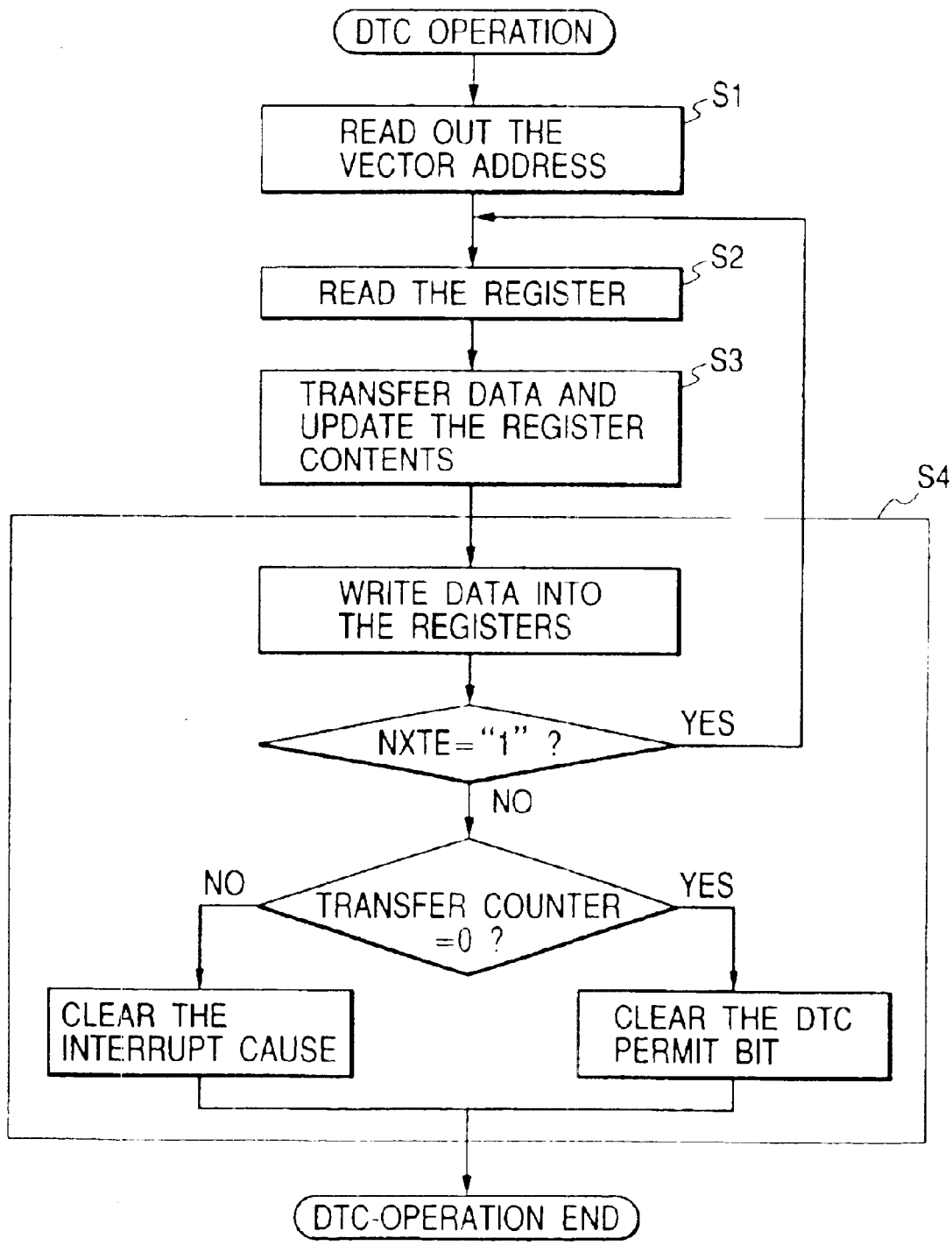
FIG. 20 is a flowchart representing a typical transfer of data by using the data-transfer controller.

FIG. 20 is a flowchart representing the operation of the DTC.

First of all, the CPU obtains a DTC vector address from the RAM as the start address (m) of a register file. Then, the CPU sets initial values in the register file beginning from the start address (m). Subsequently, the CPU sets a DTC permit bit and an interrupt-cause permit bit not shown in the figure at "1".

With the DTC permit bit set at "1", when a predetermined interrupt request is generated and the DTC is activated, the operation begins with a step S1 at which data for a vector address register (VAR) in the DTC is read out from a vector address corresponding to the activation cause and set in the VAR.

At a step S2, pieces of data read out sequentially from addresses indicated by the contents of the vector address register VAR are stored in predetermined registers in the DTC such as the mode register DTMR, the block transfer-count register BTCR, the transfer-count register TCR, the source-address register SAR and the destination-address register DAR.

At a step S3, data is transferred in accordance with the contents of the above registers. The contents of the registers are also updated with a transfer of data.

At a step S4, the contents of the registers are stored back to addresses indicated by the contents of the vector address register VAR. At that time, if an NXTE bit included in the mode register DTMR is set at "1", the flow of the operation goes back to the step S1 at which pieces of information are read out from consecutive addresses and set in the registers to repeat the processing described above.

If the NXTE bit is cleared to "0", on the other hand, the transfer operation of the DTC is halted and the contents of the transfer counter are examined. If the contents of the transfer counter are not 0, the cause clear signal is put in an active state to reset the interrupt factor flag at "0" through an interrupt controller. If the contents of the transfer counter are 0, on the other hand, the interrupt cause flag is not reset but the DTC permit bit is reset to "0". It should be noted that register to be used as the transfer counter can be changed in dependence on the transfer mode of the DTC.

After the transfer operation of the DTC is halted, the DTC permit bit is reset to "0". Since, the interrupt cause remains, the CPU carries out interrupt processing by execution of an interrupt processing routine. During the execution of the interrupt processing routine, it is necessary to reset the interrupt flag to "0".

The embodiments described above exhibits the following effects.

(1) The internal buses IAB and IDB of the microcomputer 1 are controlled independently of control of the external buses EABUS and EDBUS. To be more specific, the CPU 2 carries out an operation using the internal buses IAB and IDB independently of a transfer of data through the external buses EDBUS and EABUS controlled by the EXDMAC 4. As a result, the processing performance of the microcomputer 1 can be improved.

In addition, the logical configuration of the microcomputer 1 can be simplified without using a bus dedicated to the DMAC and a memory of a dual-port type.

(2) The buffer registers EXDiDRm are provided to be used as a source or destination location. Typically, transfer control information such as a packet command is stored in a buffer register EXDiDRm. It is not necessary to specify a buffer register EXDiDRm by using an address or acknowledge signal. Instead, since a buffer register EXDiDRm is specified by a peculiar control signal 45S, data can be transferred to or from a buffer register EXDiDRm by making only 1 data access so that the data can be transferred at a high speed. By using a buffer register EXDiDRm having a specific address in the address space of the CPU 2, processing to analyze an address for storing transfer control information is not required in an analysis of the transfer control information carried out by the CPU 2. If there are a plurality of buffer registers EXDiDRm, different addresses are assigned to them so as to allow operations to read out and write data from and into the registers to be carried out in any arbitrary order. Thus, transfer control information can be read out from the buffer registers EXDiDRm in an order matching the format of the information. As a result, the processing of the CPU 2 can be made further simpler and carried out at an even higher speed. The transfer control information can hence be accessed at a high speed in comparison with an access to transfer control information stored in an external memory.

(3) Selection of buffer registers EXDiDRm by using the transfer counter 48 allows transfer control information such as a packet command with any arbitrary length to be stored in the registers provided that the length of the information is smaller than the storage capacity of the registers. By using the buffer registers EXDiDRm repeatedly, transfer control information such as a packet command can be received repeatedly and status information can be output repeatedly as well.

(4) A cause to activate a transfer of transfer control information is made common to a cause to activate a transfer of data so that the operation of the other location of the data transfer such as the communication circuit 100 can be made common to the transfers of the transfer control information and the data. As a result, the external circuit such as the communication circuit 100 can be made simple. In addition, the number of data-transfer channels required by the EXDMAC 4 can be reduced. Thus, the utilization efficiency of the hardware can be increased.

(5) To the external-bus controller 121, the address space is divided into a plurality of address ranges each allow bus specifications such as the type of the memory, the bus width and the number of access states to be set. Accesses to the external buses EABUS and EDBUS made by the internal-bus masters such as the CPU 2 and the DMAC 3 and the external-bus master EXDMAC 4 can be controlled by the external-bus controller 121 in an integrated manner. Thus, the EXDMAC 4 which does not use the internal buses IAB and IDB is capable of making an access to the external buses EABUS and EDBUS in the same way as the CPU 2 and the DMAC 3. As a result, an increase in logical scale can be avoided.

(6) By treating an address output by the external-bus controller 121 as a special signal propagated through the external-address internal bus EXAB, the control signal and the operation of the external-bus controller DMAC 4 such as its state transition can be made simple. As a result, the logical scale of the microcomputer 1 can be reduced.

(7) Since the external-bus controller 121 arbitrates requests for a right to make an access to the external buses EABUS and EDBUS made by external-bus masters such as the EXDMAC 4 and the internal-bus controller 120 on behalf of the CPU 2 and the DMAC 3, an overhead which would be incurred during a transition of a right to make an access to the external buses EABUS and EDBUS among the EXDMAC 4, the CPU 2 and the DMAC 3 can be eliminated.

(8) The ROM 5 used for storing programs and embedded in the CPU 2 does not include the vector of the CPU 2 and, by selection of an operating mode, it is possible to store all processing programs in an external ROM except a program that needs to be executed at a high speed and must be thus stored in the embedded ROM 5. Thus, the degree of freedom to use the microcomputer 1 such as flexibility to change a processing program can be increased.

(9) The EXDMAC 4 has a plurality of data-transfer channels which are capable of receiving requests for an access to the external buses EABUS and EDBUS independently of each other. Thus, the degree of freedom to use the microcomputer 1 and the processing performance thereof can be raised. By supporting a single-address transfer of data, the number of bus cycles required in a transfer of data can be reduced and the processing performance can be further increased. By using buffer registers EXDiDRm for inputting and outputting data even in a single-address transfer of data, transfer control information such as a packet command and other data can be transferred without affecting the operation of an external device.

(10) The EXDMAC 4 has a function appropriate for a transfer of data through the external buses EABUS and EDBUS such as a transfer of data from the communication circuit 100 to the buffer RAM 101 and, in addition, the internal buses are not used when the buffer registers EXDiDRm are not used. Thus, the logical scale can be reduced. By including the latch circuit 72L for temporarily storing transferred data and the buffer registers EXDiDRm in the input/output port, a data bus for connecting the EXDMAC 4 to an external component is not required, making it possible to reduce the physical scale of the microcomputer 1.

(11) High-order bits of the address registers 40 and 41 serving as a data-transfer source and a data-transfer destination respectively are fixed to allow an operation to be carried out repetitively and a ring buffer can thus be formed with ease on the buffer RAM 101 without a load to be borne by the CPU 2. Even though start and end addresses of the ring buffer can not be specified arbitrarily, there will be no a big problem such as one encountered in a memory with a large storage capacity like the buffer RAM 101. Since the CPU 2 is capable of reading out and writing data from and into the EXDMAC 4 from time to time, processing such as control of the amount of data accumulated in the ring buffer can be executed with ease. Since a repetitive operation can be carried out, it is possible to eliminate a load such as interrupt processing to be carried out by the CPU 2.

(12) Data can be transferred through the internal buses IAB and IDB by the DMAC 3 connected to the internal buses IAB and IDB independently of a data transfer through the external buses EXBUS and EDBUS which is controlled by the EXDMAC 4. Thus, the processing performance of the microcomputer 1 can be enhanced. In a microcomputer system such as the printer controller, data can be transferred by the DMAC 3 through the internal buses to drive motors concurrently with a transfer of data through the external buses EABUS and EDBUS such as a transfer of data to the buffer RAM 101 or a host apparatus by way of the communication circuit 100. Thus, the processing performance of the microcomputer 1 can be enhanced.

(13) The communication circuit 100 can be integrated as a semiconductor integrated circuit in the same chip as the microcomputer 1 in order to reduce the size of the microcomputer system.

(14) By providing the DMAC 3 connected to the internal buses IAB and IDB and the EXDMAC 4 customized to transfers of data through the external buses EABUS and EDBUS as embedded components, the number of general data-transfer channels can be increased while an increase in logical scale is reduced to a minimum. In addition, since the DMAC 3 connected to the internal buses IAB and IDB is provided with general-purpose functions, the degree of freedom to use the microcomputer 1 is by no means lowered.

(15) By designing the DMAC 3 connected to the internal buses IAB and IDB and the EXDMAC 4 into a single module, the data-transfer channels can be used by swapping a limited number of data-transfer channels with each other. In addition, logic such as the bus interface can be shared among components.

(16) A plurality of microcomputer systems can be connected to each other by host-interface circuits to form an application wherein no system is fixed to serve as the host apparatus. Even if there is no fixed host apparatus, however, one of the microcomputer systems requesting another to transmit data is regarded as a temporary host apparatus so that data can be exchanged among the microcomputer systems.

(17) A data-transfer controller (DTC) can be used as a substitute for the DMAC 3 connected to the internal buses IAB and IDB so as to allow data-transfer information to be held in a RAM. As a result, increases in physical and logical sizes can be avoided and it is possible to keep up with a number of requests for activation or requests for a transfer of data exceeding the number of data-transfer channels in the DMAC 3.

The scope of the present invention discovered by the inventor is not limited to details of the embodiments described above. A variety of changes and modifications can be made to the embodiments as far as they do not depart from the gist and the true spirit of the present invention.

For example, the data-transfer unit employing buffer registers does not have to be the EXDMAC 4. Any data-transfer unit can be used as far as there is no need to specify an address register thereof by using the address of the data-transfer unit or an acknowledge signal. Thus, as the data-transfer unit, an ordinary DMAC or a data-transfer controller can be employed. A data-transfer controller is described for example in a document published by Hitachi Corporation in March 1995 with a title of "H8S/2655 Series Hardware Manual."

The number of buffer registers is arbitrary. That is, the number of buffer registers can be set in accordance with requirements of the individual system. Buffer registers can be provided for each data-transfer channel or shared among data-transfer channels. A buffer register can be physically provided in the module of the internal-bus controller DMAC or the module of the bus controller in addition to the I/O port.

The width of an address register of the DMAC 3 and the EXDMAC 4 does not have to be 24 bits. The number of address bits can be changed in accordance with the address space of the CPU 2 or the semiconductor integrated circuit. In the case of an address space of 4 Gbyte, for example, the width of an address register is set at 32 bits.

A variety of data-transfer modes can be set for the data-transfer unit such as the EXDMAC 4. The size of the ring buffer can also be changed. A register used for specifying the size of the ring buffer can also be provided separately. It is also possible to limit the data-transfer modes to a single-address mode in which only 1 address register is used. The configuration of the microcomputer 1 is also flexible. For example, it is possible to include other components and functional blocks in the configuration.

Actual circuit configurations such as the configurations of the EXDMAC 4, the bus controller and the internal buses can also be implemented differently. It is also possible to design the internal buses IAB and IDB as well as the internal P buses PAB and PDB into a single configuration.

Applications of a microcomputer system are not limited to control of a printer. For example, a microcomputer system can be used as a digital-communication system wherein data is transferred from a reception circuit to a buffer RAM to be subjected to processing such as demodulation and error correction, and the data is further modulated and stored in another buffer RAM before being transferred from the other buffer RAM to a transmission circuit. The transfers of data from the reception circuit to the buffer RAM and from the other buffer RAM to the transmission circuit are controlled by the EXDMAC concurrently with other processing carried out by another processor such as a CPU, allowing transfers of data using the external buses to be controlled to enhance the processing performance. Data registers can be used for receiving and transmitting a packet command and for inputting and outputting status information.

In the above description, the present invention discovered by the inventor is exemplified by an application to a microcomputer with an embedded ROM in a field serving as a background of the invention. It should be noted, however, that the scope of the present invention is not limited to the application. For example, the present invention can also be applied to a microcomputer including no embedded ROM or a digital signal processor (DSP). The present invention can be applied to any computers or processors provided that they include an embedded a data-transfer unit.

Effects provided by representative inventions disclosed in this specification are explained briefly as follows.

Buffer-register means are included in a bus-interface means used to make an access to the external buses controlled by the data-transfer unit. In a transfer of data through the external buses controlled by the data-transfer unit, a buffer register means can be used as a source or destination location so as to allow transfer control information such as a packet command to be received and analyzed with ease and data to be transferred at a high speed. The easy reception and the easy analysis of transfer control information as well as the high-speed transfer of data contribute to improvement of the processing performance of the microcomputer and enhancement of the degree of freedom to use the microcomputer.

Buses and bus-control means are designed so that data can be transferred by the data-transfer unit through the external buses concurrently with an operation such as execution of an instruction using the internal buses by a data processing unit such as the CPU. As a result, the processing performance of the microcomputer can be improved, the degree of freedom to use the microcomputer can be raised and the logical and physical configurations can each be reduced to a minimum.

It is thus possible to enhance the total performance of data processing of a microcomputer including an embedded data-transfer unit such as the DMAC.

The microcomputer system employing the microcomputer described above is capable of controlling a transfer of data from and to a device external to the microcomputer concurrently with internal processing of data in the microcomputer. In addition, the amount of processing overhead is small so that an increase in physical scale can be reduced to a minimum.

What is claimed is:

1. A semiconductor integrated circuit including:
   a data transfer unit for controlling a transfer of data to and from a external memory coupled to said semiconductor integrated circuit; and
   a bus-interface circuit controlling an external access by said data-transfer unit,
   wherein said bus-interface circuit includes a plurality at buffer-register circuits which store a plurality of data;
   wherein said data-transfer unit includes:
   a memory specification circuit capable of specifying said external memory
   a buffer specification circuit capable of specifying one of said buffer-register circuits
   a mode specification circuit capable of specifying an operating mode of a data transfer; and
   a data-transfer control circuit for controlling a data transfer on the basis of states of said memory specification circuit, said buffer specification circuit and said mode specification circuit.

2. The semiconductor integrated circuit according to claim 1,
   wherein said mode specification circuit includes a first information field for determining whether the location of either a destination or a source of a data transfer is to be specified by said buffer specification circuit, or the locations of both a destination and a source of a data transfer are to be specified by said memory specification circuit.

3. The semiconductor integrated circuit according to claim 2,
wherein said memory specification circuit includes an address register for specifying an address in said external memory and a control-signal output circuit for outputting an acknowledge signal from said bus-interface circuit in order to specify an external device with an acknowledge-signal pin.

4. A microcomputer including:
a data processing unit capable of executing a plurality of instructions;
a data transfer unit for controlling a data transfer to and from an external memory device;
a first internal bus coupled to said data processing unit;
a second internal bus coupled to said data transfer unit;
a bus interface unit capable of capable of controlling an interface of said first internal bus, said second internal bus and outside of said microcomputer; and
a bus-control unit for arbitrating requests for a bus access right and controlling said each of buses, wherein said bus-interface Lnit includes a plurality of buffer register unit storing a plurality of data, wherein said data-transfer unit includes:
a memory specification unit capable of specifying said external memory device;
a buffer specification unit capable of specifying one of said buffer-register unit without resorting to said memory specification unit;
a mode specification unit capable of specifying an operating mode of a data transfer; and
a data-transfer control unit for controlling a transfer of data an the basis of states of said memory specification unit said buffer specification unit and said mode specification unit; and said mode specification unit includes a first information field for determining whether the location of either a destination or a source of a data transfer is to be specified by said buffer specification unit, or the locations of both a destination and a source of a data transfer are to be specified by said memory specification unit.

* * * * *